(12) United States Patent
Grangetto et al.

(10) Patent No.: US 10,038,890 B2
(45) Date of Patent: Jul. 31, 2018

(54) METHOD AND DEVICE FOR GENERATING, STORING, TRANSMITTING, RECEIVING AND REPRODUCING DEPTH MAPS BY USING THE COLOR COMPONENTS OF AN IMAGE BELONGING TO A THREE-DIMENSIONAL VIDEO STREAM

(71) Applicant: SISVEL TECHNOLOGY S.R.L., None (TO) (IT)

(72) Inventors: Marco Grangetto, Pinerolo (IT); Maurizio Lucenteforte, Turin (IT); Paolo D'Amato, Rome (IT)

(73) Assignee: Sisvel Technology S.R.L., None (TO) (IT)

(*) Notice: Subject to any disclaimer, the term of this patent is extended or adjusted under 35 U.S.C. 154(b) by 429 days.

(21) Appl. No.: 14/304,404

(22) Filed: Jun. 13, 2014

(65) Prior Publication Data

US 2014/0368610 A1 Dec. 18, 2014

(30) Foreign Application Priority Data

Jun. 18, 2013 (IT) .............................. TO2013A0503

(51) Int. Cl.
| | |
|---|---|
| H04N 13/00 | (2018.01) |
| H04N 13/139 | (2018.01) |
| H04N 1/32 | (2006.01) |
| H04N 19/597 | (2014.01) |
| H04N 19/63 | (2014.01) |
| H04N 19/80 | (2014.01) |

(Continued)

(52) U.S. Cl.
CPC ....... *H04N 13/139* (2018.05); *H04N 1/32309* (2013.01); *H04N 13/15* (2018.05); *H04N 13/161* (2018.05); *H04N 19/59* (2014.11); *H04N 19/597* (2014.11); *H04N 19/63* (2014.11); *H04N 19/80* (2014.11)

(58) Field of Classification Search
None
See application file for complete search history.

(56) References Cited

U.S. PATENT DOCUMENTS

| | | |
|---|---|---|
| 6,628,419 B1 | 9/2003 | So et al. |
| 2009/0015662 A1 | 1/2009 | Kim et al. |

(Continued)

FOREIGN PATENT DOCUMENTS

| | | |
|---|---|---|
| EP | 1 705 929 A1 | 9/2006 |
| JP | 2004-227231 A | 8/2004 |
| WO | 2011/077343 | 6/2011 |

OTHER PUBLICATIONS

Italian Search Report dated Jan. 22, 2014, issued in Italian Application No. TO2013A0503, filed Jun. 18, 2013.

(Continued)

*Primary Examiner* — Kate H Luo
(74) *Attorney, Agent, or Firm* — Workman Nydegger

(57) ABSTRACT

A method is described for generating a color image composed of a plurality of components (Y, U, V) by starting from at least one depth or disparity map (DM1, DM2), wherein a first set of pixels of said at least one depth or disparity map (DM1, DM2) is entered into the luminance component (Y) of said color image, and wherein a second and a third sets of pixels of said at least one depth or disparity map (DM1, DM2) are entered into the two chrominance components (U, V) of said color image.

22 Claims, 21 Drawing Sheets

(51) Int. Cl.
*H04N 19/59* (2014.01)
*H04N 13/161* (2018.01)
*H04N 13/15* (2018.01)

(56) References Cited

U.S. PATENT DOCUMENTS

| | | |
|---|---|---|
| 2011/0116712 A1 | 5/2011 | Matsuhira |
| 2012/0008672 A1 | 1/2012 | Gaddy et al. |
| 2012/0183066 A1* | 7/2012 | Oh .................. H04N 19/132 375/240.13 |
| 2013/0076749 A1* | 3/2013 | Maeda .................. G06T 15/08 345/424 |

OTHER PUBLICATIONS

V. Paradiso, et al., *A Novel Interpolation Method for 3D View Synthesis*, 3DTV-Conference: The True Vision—Capture, Transmission and Display of 3D Video (3DTV-CON), 2012, pp. 1-4.

\* cited by examiner $$w0=(a+c)/2$$
$$w1=(b+d)/2$$
$$w2=(a-c)/2$$
$$w3=(b-d)/2$$

$$a=(w0+w2)$$
$$b=(w1+w3)$$
$$c=(w0-w2)$$
$$d=(w1-w3)$$

| a | b |
|---|---|
| c | d |

FIG. 10

Sub-band disassembling of two depth maps

Undersampling of HL'

4:2:0 YUV image

METHOD AND DEVICE FOR GENERATING, STORING, TRANSMITTING, RECEIVING AND REPRODUCING DEPTH MAPS BY USING THE COLOR COMPONENTS OF AN IMAGE BELONGING TO A THREE-DIMENSIONAL VIDEO STREAM

CROSS-REFERENCE TO RELATED APPLICATIONS

This application claim priority to Italian Application No. TO2013A000503, filed Jun. 18, 2013, which is incorporated herein by specific reference.

BACKGROUND OF THE INVENTION 1. the Field of the Invention

The present invention relates to a method and a device for generating, storing, transmitting, receiving and reproducing depth maps by using the color components of an image belonging to a three-dimensional video stream.

2. The Relevant Technology

The development of stereoscopic video applications largely depends on the availability of efficient formats for representing and compressing the three-dimensional video signal. Moreover, in television broadcast applications (3D-TV) it is necessary to maintain the highest possible degree of backward compatibility with existing 2D systems.

For distribution (or transmission), the currently most widespread technical solutions are based on the so-called "frame compatible arrangement", wherein the two stereoscopic views, relating to the same time instant, are re-scaled and composed to form a single image compatible with the existing formats. Among these solutions, the top-and-bottom, side-by-side and tile formats are known. These solutions allow using the entire existing video signal distribution infrastructure (terrestrial, satellite or cable broadcasting, or streaming over IP network), and do not require new standards for compression of the video stream. In addition, the current AVC/H.264 coding standard (Advanced Video Coding) and the future HEVC standard (High Efficiency Video Coding) already include the possibility of signalling this type of organization to allow for proper reconstruction and visualization by the receiver.

For display, the two currently most widespread technical solutions are based either on the "frame alternate" principle (i.e., the two views are presented in time succession on the screen) or on the "line alternate" principle, i.e., the two views are arranged on the screen with alternate rows (i.e., they are "interlaced"). In both cases, for each eye to receive the corresponding view, the spectator needs to use a pair of glasses, which may be either "active" ones, i.e., shutter glasses, in the frame alternate case, or "passive" ones, i.e., with differently polarized lenses, in the line alternate case.

The future of three-dimensional visualization will be determined by the diffusion of new self-stereoscopic screens that do not require the user to wear any glasses, whether passive or active ones. These 3D display devices, which are currently still at the prototypal stage, are based on the use of parallax lenses or barriers that can cause the viewer to perceive two different stereoscopic views for each viewpoint that the user may be at when moving angularly around the screen. Therefore, these devices can improve the 3D vision experience, but they require the generation of a large number of views (some tens of them).

As regards 3D video representation, managing the production and distribution of a large number of views is a very exacting task. In recent years, the scientific community has evaluated the possibility of creating an arbitrarily large number of intermediate views by using known Depth Image Based Rendering (DIBR) techniques, which exploit the so-called scene depth map. These formats are also known as "Video+Depth" (V+D), wherein each view is accompanied by a dense depth map. A dense depth map is an image in which each pixel in planar coordinates (x,y), i.e., column, row, represents a depth value (z) corresponding to the pixel of the respective view having the same coordinates. The values of the depth maps can be calculated by starting from the two views obtained by a stereoscopic video camera, or else they can be measured by suitable sensors. Such values are generally represented by using images with 256 grayscale levels, which are compressed by using standard techniques. The Depth Image Based Rendering techniques exploit the fact that, given the coordinates (x,y,z), i.e., the position in the depth plane plus the depth associated with each pixel, it is possible to re-project the pixel onto another image plane relating to a new viewpoint. The most widespread application context is that of a system of stereoscopic video cameras, wherein the two video cameras are positioned horizontally at a distance b between their two optical centres, with parallel optical axes and co-planar image planes. In such a configuration, there is simple relation between the depth z, associated with one pixel, and the so-called disparity d, i.e., the horizontal translation that must be applied to a pixel of the image of the right (or left) video camera in order to obtain the corresponding position in the image plane of the left (or right) video camera. Disparity may be either positive or negative (translation to the left or to the right), depending on the video camera taken into account. With f indicating the focal length of the two video cameras, the following relation between depth z and disparity d exists:

$$d = fb/z.$$

For further details, see article: Paradiso, V.; Lucenteforte, M.; Grangetto, M., "A novel interpolation method for 3D view synthesis," 3DTV-Conference: The True Vision—Capture, Transmission and Display of 3D Video (3DTV-CON), 2012, vol., no., pp. 1, 4, 15-17 Oct. 2012.

Since according to the above-described hypotheses disparity is a simple function of depth, the depth map and the disparity map carry the same information and are therefore interchangeable. In addition, it must be pointed out that the images which are referred to as depth maps within the MPEG context represent the values of 1/z, as opposed to z, mapped in the 0-255 interval. In the following, the term "depth map" will only be used to indicate any representation of depth or disparity.

It should be noted that the video signal made up of a pair of (left and right) images and the respective depth maps has also been chosen as a use case by the MPEG standardization committee for evaluating the techniques that will be introduced in the future 3D coding standards.

This leads to the need for efficiently managing the storage, transmission, reception and reproduction of television signals comprising depth maps.

SUMMARY OF THE INVENTION

The purpose of the present invention therefore is to provide a method and a device for generating, storing, transmitting, receiving and reproducing depth maps by using the color components of an image, which can overcome the limitations inherent in the solutions known in the art.

As aforementioned, a depth map is suited for representation as a grayscale image, i.e., constituted by a single value per position (x,y). The term "pixel" will be used below to indicate a single element (or point) of an image; each pixel is characterized by its position (x,y) and by values such as color or intensity, which vary as a function of the representation system in use. In the television field, the pixel representation system known as luminance (Y) and chrominance (U,V) is generally adopted. In general, depth maps are represented as digital video by using the Y component only.

The basic idea of the present invention is to exploit also the U and V chrominance components to represent the values of the depth map, thus creating a so-called "dummy color" image, which allows for better image compaction.

A dummy color image (hereafter referred to, for brevity, as "color image") is, in this context, an image in which also the chrominance components carry useful information, which is not however color information but, in this case, luminance information relating to pixels that have been removed from the Y component.

The choice of the pixels of the depth matrix to be entered into the U and V components of the color image of W×H size is made in a manner such as to obtain spatial correlation between the Y, U, V components, i.e., between the real luminance and these additional fictitious components, which is useful to ensure compliance with the operation of the standard coding algorithms, e.g., MPEG, which assume the existence of a correlation between the three Y, U, V components of the various pixels. This also allows using standard encoders and decoders for the compression techniques employed for the real color images.

Spatial correlation means that the values arranged on the Y,U,V components belong to pixels that are spatially close in the depth map.

A preferred solution uses the W×H rectangle for entering two depth maps, each one referring to a respective video image of the stereoscopic pair, thus obtaining a single color image.

Other preferred solutions employ, for the depth maps, the formats in use for television images, known as 4:2:0 or 4:2:2 Y,U,V. In the former format, which is typically used for distribution, in the even rows (0,2,4, etc.) only the pixels in the even columns (0,2,4, etc.) contain chrominance information, while all pixels in the odd rows contain luminance information only: it follows that, as a whole, only one pixel out of four contains chrominance information. In the latter format, which is typically employed in the production chain, in all rows only the pixels in the even columns contain chrominance information; it follows that, as a whole, one pixel out of two contains such information.

Typically, reference is made to depth maps with values represented on 256 levels, i.e., 8 bits per pixel.

In a first series of examples of preferred solutions, which will be described below, reference will be made to the 4:2:0 YUV format, whereas a second series of examples will refer to the 4:2:2 YUV format.

Among the various frame-packing systems, the tile format (described in WO2011/077343-A1) allows entering a depth map without subtracting space from the images relating to the two views.

With reference to FIG. 1, in the tile format a pair of stereoscopic images L and R is entered into a bigger video frame (C), one of the two images (e.g., L) being recopied unchanged, and the other image (e.g., R) being broken up into three regions (R1, R2 and R3). These regions are arranged, in the composite frame C, in the area left available by the first image; an unused area will still remain, in which a depth map with halved horizontal and vertical resolution can be entered. By using the method proposed by the invention, two depth maps, instead of one, can be entered into the same area.

The present inventive idea is not however limited to a particular frame-packing arrangement, but it allows entering a pair of depth maps into a generic rectangular image with W columns and H rows. Of course, the W×H area may represent a portion of a bigger image used for transporting the 3D video via frame-packing mechanisms.

As an alternative, the stereoscopic video stream may consist of several data streams, e.g., inserted into a packet-type multiplex, each one carrying the information of one or more images or of their depth map(s).

In a television production, distribution and fruition system using the various aspects of the present invention, the steps carried out upon reception will be inverse to those carried out upon transmission, for the purpose of reconstructing the depth maps. At the receiver, the values of the depth maps, which were allocated to the Y, U and V components of the input color image, are repositioned in such a way as to form the initial depth maps. The reconstruction procedure may possibly utilize known filtering and/or interpolation operations in order to estimate any original depth values which might have been discarded due to lack of available space while forming the color image.

It is one object of the present invention to provide a method, and an apparatus thereof, for generating a color image composed of a plurality of components by starting from at least one depth map, wherein a first set of pixels of said at least one depth map is entered into the luminance component of said color image, and wherein a second and a third sets of pixels of said at least one depth map are entered into the two chrominance components of said color image.

It is another object of the present invention to provide a method, and an apparatus thereof, for generating a video stream comprising a sequence of color images, wherein at least one part of the frame comprises a color image obtained by using a method for generating a color image as previously described.

It is another object of the present invention to provide a method, and an apparatus thereof, for reconstructing at least one depth map by starting from a color image composed of a plurality of components, wherein a first set of pixels taken from the luminance component, a second set of pixels taken from one of the chrominance components, and a third set of pixels taken from the other chrominance component of said color image are entered into said at least one depth map.

It is another object of the present invention to provide a method, and an apparatus thereof, for reconstructing two sequences of depth maps by starting from a stereoscopic video stream, wherein during the reconstruction of each map of the two sequences a method for reconstructing at least one depth map as previously described is applied to each frame of the stream.

It is a particular object of the present invention to provide a method and a device for generating, storing, transmitting, receiving and reproducing depth maps by exploiting the color components of a color image as set out in the claims, which are an integral part of the present description.

BRIEF DESCRIPTION OF THE DRAWINGS

Further objects and advantages of the present invention will become apparent from the following detailed description of some examples of embodiment thereof and from the annexed drawings, which are only supplied by way of non-limiting example, wherein:

FIG. 10 shows a variant of the invention concerning the way of transforming samples of depth maps to obtain a color image containing two depth maps according to the 4:2:0 top-and-bottom solution with mean sums and differences;

In the drawings, the same reference numerals and letters identify the same elements or components.

DETAILED DESCRIPTION OF THE PREFERRED EMBODIMENTS

The following will describe several specific variants of implementation of the basic ideas of the present invention as concerns the various possible arrangements of two depth maps in a single color image having a size of W×H pixels (which, as already explained, may in turn be entered into a larger composite frame containing also other images relating to the same stereoscopic video stream).

Let us consider two depth maps with W×H resolution, corresponding to 2×W×H samples on 8 bits, i.e., 2×W×H bytes. Said pair of maps is to be entered into a single 4:2:0 or 4:2:2 YUV "composite" color image having W×H resolution.

The various embodiments of the invention described below are based on the use of a frame-packing format for entering two depth maps into the rectangle of W×H size. Two depth maps may, for example, be arranged in top-and-bottom mode, by reducing their resolution to W×(H/2) and placing them in the upper part and lower part, respectively, of the Y component only, or in side-by-side mode, by reducing their resolution to (W/2)×H and placing them in the left part and right part, respectively, of the Y component only. Afterwards, according to the invention, the discarded pixels are recovered and entered into the U and V signals.

Side-by-Side 4:2:0 Solution.

The following will describe two techniques that differ from each other in the positioning of the samples on the chrominance components.

Figure 2A:
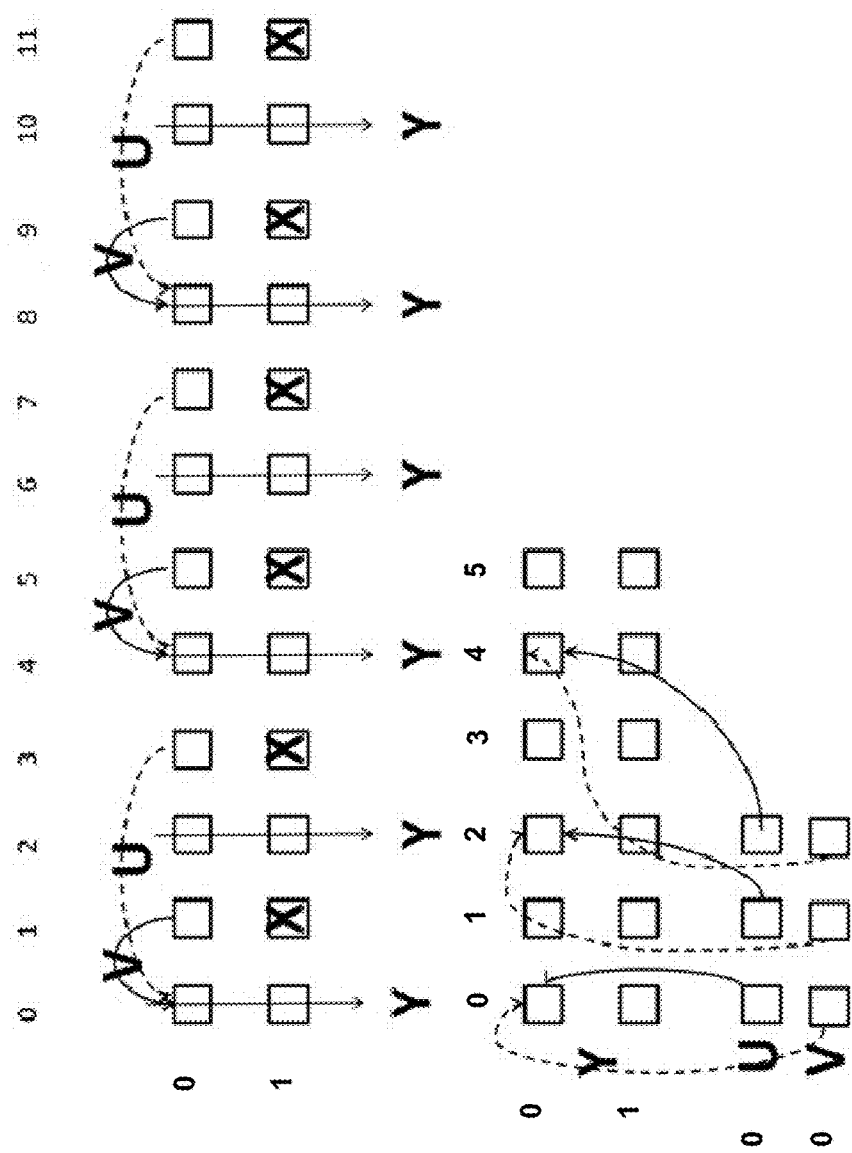
FIGS. 2a and 2b show two graphic representations of a first variant of the invention concerning the way of obtaining a color image containing two depth maps according to the 4:2:0 side-by-side solution.

The first technique (hereafter referred to as A mode) for obtaining a color image by starting from at least one depth map is shown in FIG. 2a. The Figure refers to a pair of rows of the depth map (e.g., the depth map DM1 relating to the left view of a stereoscopic video), and shows how to associate the depth values with the Y,U,V components of a composite color image with a halved number of columns.

The notation D(j,i) is used to denote the pixel of row j and column i of the depth map DM1 and DM2, with j=0,1, . . . , H−1 and i=0, 1, . . . , W−1. By using the technique described in FIG. 2a, the depth map must be reorganized into a color image made up of 3 components:

Y(j,i), with j=0, . . . , H−1, and i=0, . . . , W/2−1

U(j,i) and V(j,i), with j=0, . . . , H−1, and i=0, . . . (W/2)−1, wherein the indices j and i take only even values because of the 4:2:0 YUV undersampling.

With these notations, the pixel reorganization shown in FIG. 2a is obtained by applying the following rules:

For each pixel D(j,i)
1. If i is even: Y(j,i/2)=D(j,i)
2. If j is even and the module relative to 4 of i is equal to 1:

$$V\left(j, \frac{i-1}{2}\right) = D(j, i).$$

3. If j is even and the module relative to 4 of i is equal to 3:

$$U\left(j, \frac{i-3}{2}\right) = D(j, i).$$

4. Otherwise, D(i,j) is discarded.

By applying these rules, one obtains a Y component of H×W/2 resolution containing only the even columns of the depth map. The V component collects the depth values with even row index corresponding to the columns 4k+1, with k being a positive integer greater than or equal to zero, i.e., the columns 1, 5, 9, . . . of the depth map are positioned on the V component at the columns 0, 2, 4 . . . of the color map. Finally, the U component collects the depth values with even row index corresponding to the columns 4k+3, with k being an integer greater than or equal to zero, i.e., the columns 3, 7, 11, . . . of the depth map are positioned on the U component at the columns 0, 2, 4 . . . of the color map.

The depth values of odd row and odd column are thus lost, i.e., those indicated in the Figure by a cross or letter "X". Therefore, for each depth map the samples are spatially organized into a new 4:2:0 YUV color image with W/2×H resolution, while keeping a high spatial correlation between the Y,U,V components, i.e., the images represented by the Y, U and V components represent versions of the same image with alternate undersamplings. This is very important because the MPEG compression algorithms assume a spatial correlation between the U and V components; therefore, they would not work well if such correlation did not exist.

Figure 5:
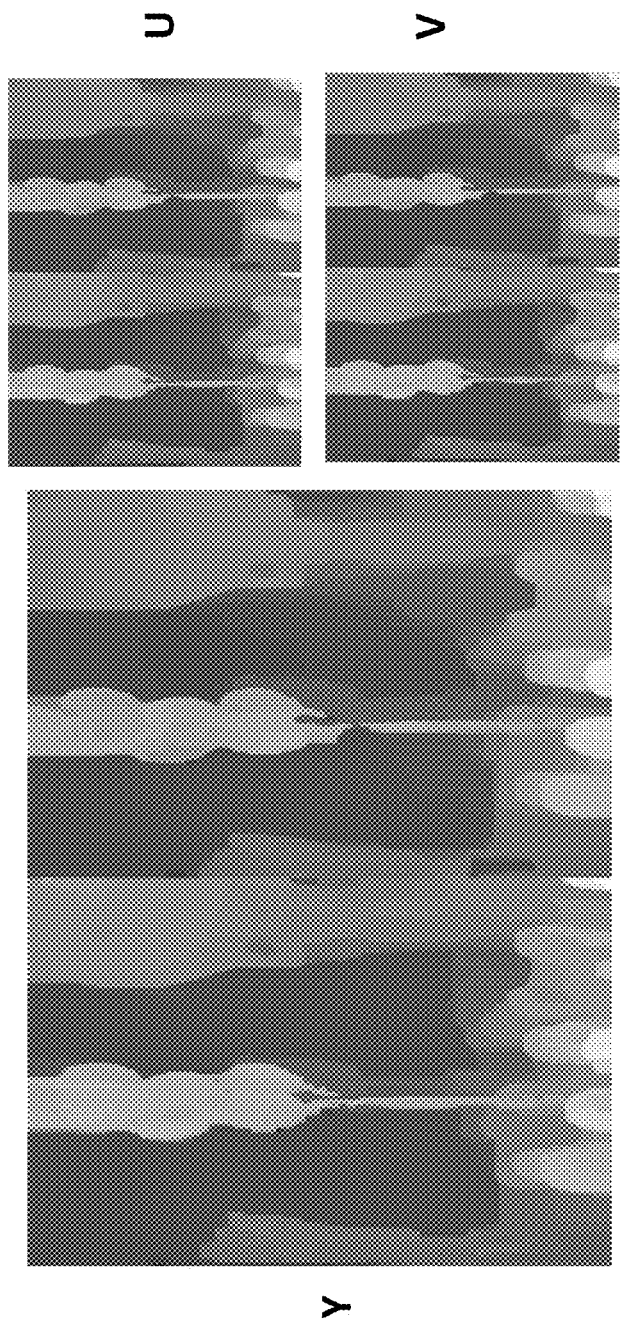
FIG. 5 shows images corresponding to the Y,U,V components of a color image obtained by arranging next to each other two depth maps in 4:2:0 side-by-side mode.

By arranging next to each other (horizontally) two images thus obtained by starting from a pair of depth maps, an image with W×H resolution is finally generated, as shown in FIG. 5. In said Figure, since colors cannot be used, the three Y, U and V components are represented separately.

Figure 2B:
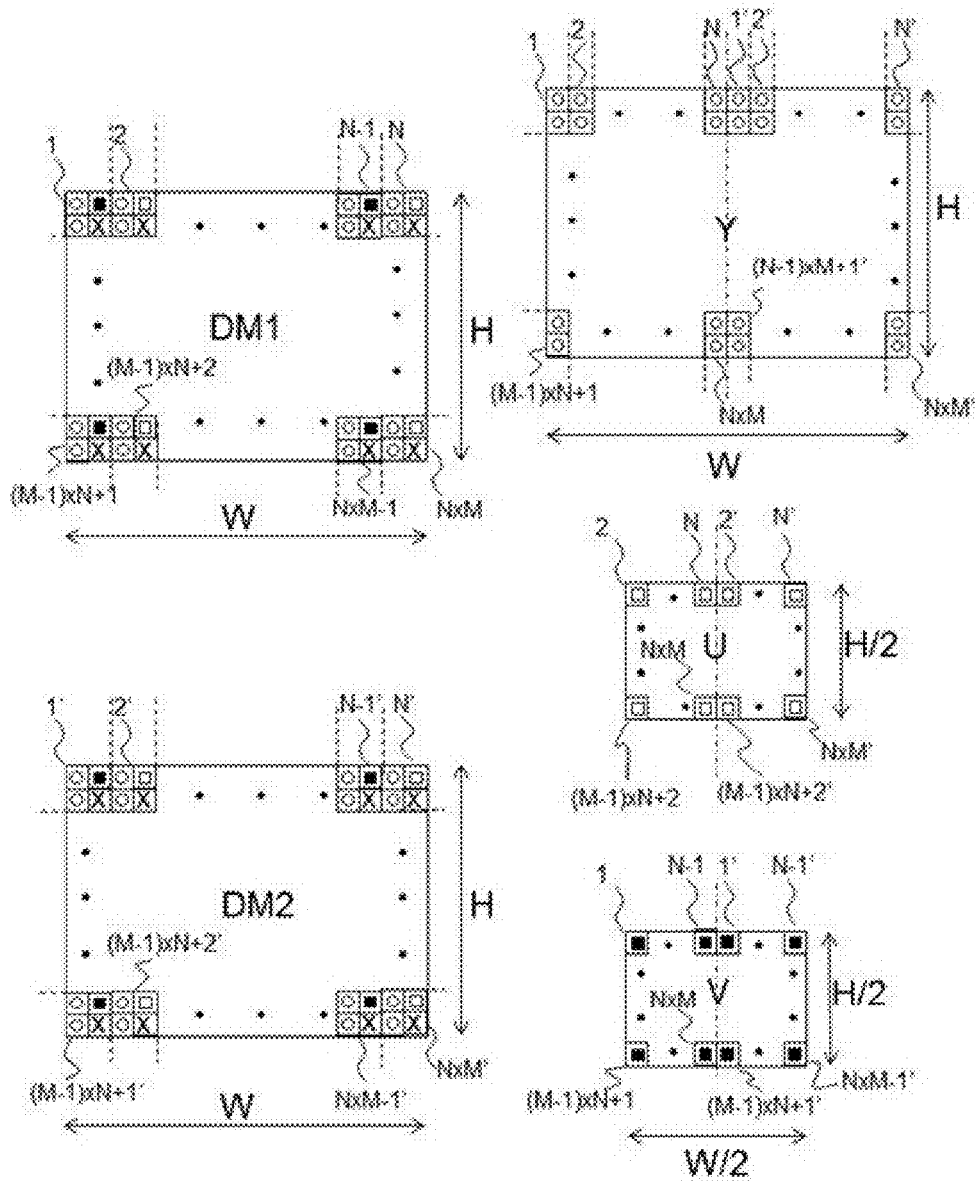

For more clarity, FIG. 2b shows a schematic representation of the way in which the two depth maps of W×H size, designated DM1 and DM2, are distributed in the 4:2:0 color image (Y,U,V), still in A mode. The pixels are represented by small squares with inscribed geometric figures; the 2×2 pixel blocks of the depth maps DM1 and DM2, implicitly determined by using the technique shown in FIG. 2a and the above formulae, are sequentially numbered, in the row scanning order, either with no apostrophes (1, 2, . . . , N×M, with N=W/2 and M=H/2) or with apostrophes (1', 2', . . . , N×M', with N=W/2 and M'=H/2), depending on whether they belong to DM1 or DM2, and equal small squares correspond to the same pixel of the initial block. Discarded pixels are marked with a cross.

When reorganizing the pixels of the depth maps DM1 and DM2, they are broken up into 4-pixel blocks of 2×2 size. The two pixels of the left column of each 2×2 block of DM1 (the 2-pixel blocks of squares with a circle of 1×2 size) are arranged one next to the other in the luminance component Y of the dummy color image, following the row scanning of the depth map. In this manner, the left half of Y is occupied; the same is done for DM2 to occupy the right half.

Still using a row scanning, the upper left pixel of said 2×2 blocks of DM1 (1-square block with an inscribed square) is alternately placed in the first available position in the upper left corner of the chromatic components V (solid square) and U (hollow square). In this manner, the left halves of U and V are occupied. The same is done for the 2×2 blocks of DM2 to occupy the right halves. The pixels of the 2×2 blocks of DM1 and DM2 which are located in the lower right corner (marked with a cross in FIG. 2b) are discarded.

Note the side-by-side configuration taken by Y, U and V, and the correspondence between these components and those obtained experimentally by using this embodiment of the invention (FIG. 5).

Once the color image has been received, possibly after coding, transmission, reception and decoding, the depth values can be repositioned by reversing the steps described in FIG. 2.

In particular, with reference to FIG. 2b, DM1 and DM2 are broken up into W/2×H/2 blocks of 2×2 pixels. Still following a row scanning, each 2-pixel 1×2 block of the Y component of the first W/2 columns of the dummy color image is recopied into the left column of the homologous 2×2 blocks of DM1, while the 1×2 blocks of the remaining W/2 columns of Y are recopied into the left column of the homologous 2×2 blocks of DM2 (squares with circles in FIG. 2).

When subjecting the chromatic components and the maps to row scanning, the pixels of the first W/4 columns of V (solid square) and U (hollow square) are alternately recopied in the upper right position of the homologous block of DM1, by taking them from the same row and column position of U and V. The same is done for the pixels of the remaining W/4 right columns of V and U with the 2×2 blocks of DM2 to reconstruct also the second depth map. Both will show, in this embodiment, a grid including W×H/4 positions with missing pixel values, i.e., one value out of two will be missing in the even rows of the depth map. Such values can be easily interpolated through per se known techniques, by exploiting the high spatial correlation that characterizes depth maps.

Figure 3:
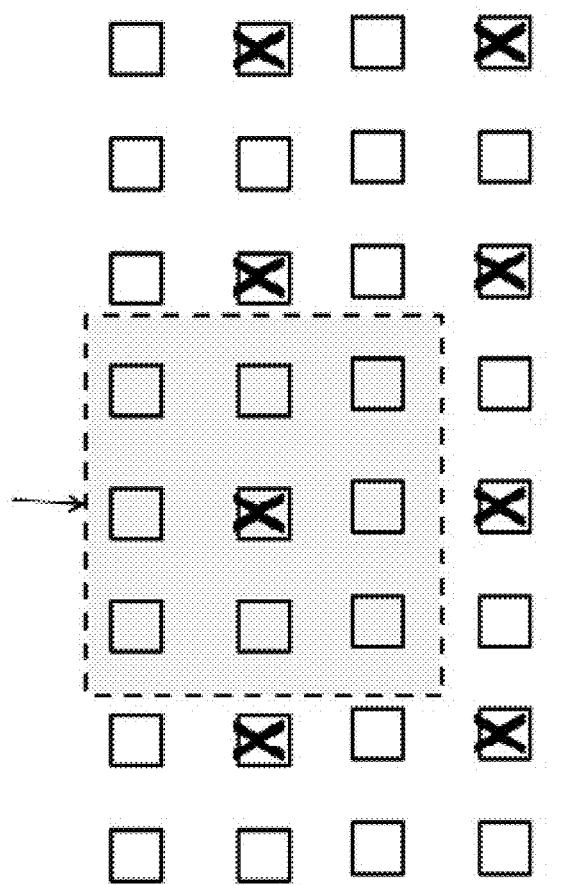
FIG. 3 shows one example of implementation of an interpolation technique applicable on the reception side for covering certain values missing in the reconstructed depth map.

FIG. 3 shows one example of an interpolation technique that uses a simple spatial filter (e.g., mean filter or median filter) with a 3×3 mask. By using a 3×3 mask centered around the missing value, one can exploit the 8 depth values received around the missing one in order to estimate the one in the central position. Experiments carried out with a median filter have shown that, when using the depth maps provided by the MPEG committee, the depth map with W×H resolution can be reconstructed with a fidelity higher than 50 dB of peak signal-to-noise ratio (PSNR).

This reconstruction technique by interpolation can be used, of course, in all variants described herein.

Figure 4:
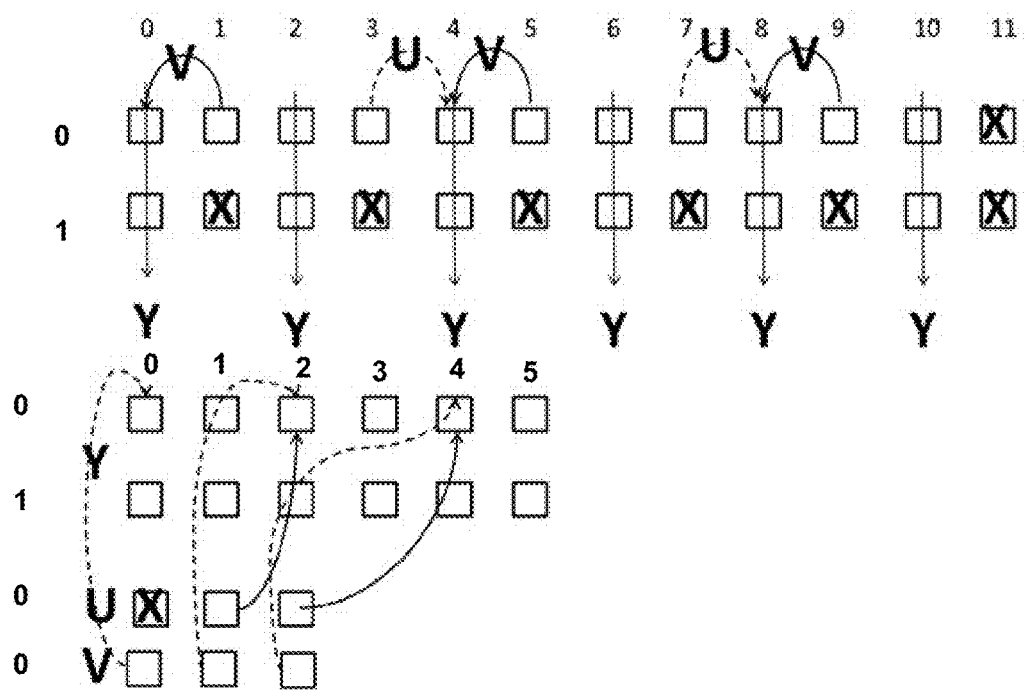
FIG. 4 shows a second variant of the invention concerning the way of obtaining a color image containing two depth maps according to the 4:2:0 side-by-side solution.

The following will introduce a variant of the previous side-by-side solution, referred to as B mode. The arrangement of the U,V components of the previous solution can be improved as concerns the spatial correlation between the components, as shown in FIG. 4. This result is attained by adopting the following placement rules:

For each pixel D(j,i)

1. If i is even: Y(j,i/2)=D(j,i)
2. If j is even and the module relative to 4 of i is equal to 1:

$$V\left(j, \frac{i-1}{2}\right) = D(j, i).$$

3. If j is even and the module relative to 4 of i is equal to 3:

$$U\left(j, \frac{i+1}{2}\right) = D(j, i).$$

4. Otherwise, D(i,j) is discarded.

Compared with the previous solution, this one ensures a shorter spatial distance between the allocated pixels of the U,V and Y components. In particular, the assignments made at steps 2 and 3 of the algorithm ensure better alignment between the components.

By applying these rules, one obtains a Y component of H×W/2 resolution containing only the even columns of the depth map. The V component collects the depth values with even row index corresponding to the columns 4k+1, with k being a positive integer greater than or equal to zero, i.e., the columns 1, 5, 9, . . . of the original depth map are positioned on the V component at the columns 0, 2, 4, . . . of the color image. Finally, the U component collects the depth values with even row index corresponding to the columns 4k+3, with k being an integer greater than or equal to zero, i.e., the columns 3, 7, . . . of the original depth map are positioned on the U component at the columns 0,2, . . . of the color map.

It should be noted that, at step 3 of the algorithm, column index values $$\frac{i+1}{2} \geq \frac{W}{2}$$

can be obtained at the right edge of the depth map (e.g., the depth value with i=11 in the Figure cannot be represented on the color image). At the reconstruction stage, these values can be interpolated by using techniques known in the art.

Likewise, the pixels in the first column of the color image have no value assigned to the U component (a default value can be freely assigned, typically 128).

Finally, since color images cannot be provided, FIG. 5 shows the images corresponding to the single Y,U,V components of a color image obtained by arranged next to each other, in side-by-side mode, two depth maps corresponding to a pair of stereoscopic images, obtained in accordance with the above-described procedures.

Top-and-Bottom 4:2:0 Solution.

In order to obtain a top-and-bottom configuration, it is necessary to transform the depth map with W×H resolution into a color image with W×H/2 resolution. Such a result is attained by applying the same methods described above, exchanging the row and column roles.

Figure 6:
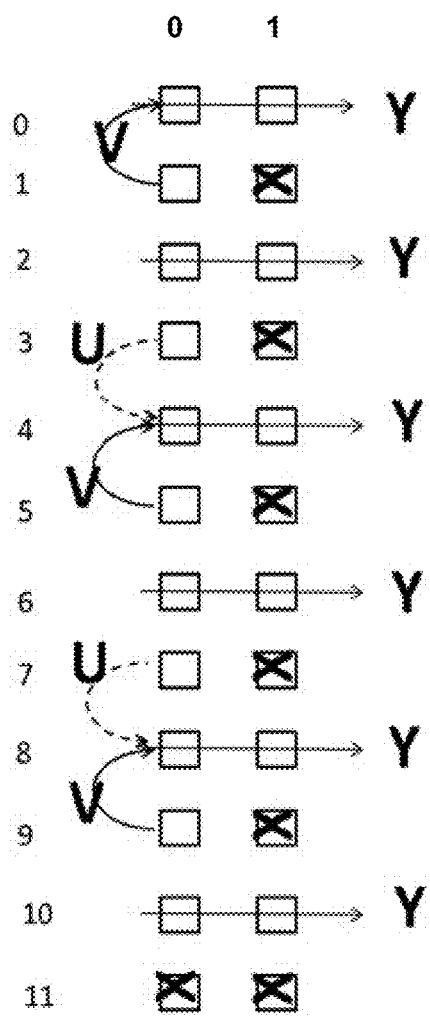
FIG. 6 shows a variant of the invention concerning the way of obtaining a color image containing two depth maps according to the 4:2:0 top-and-bottom solution.
Figure 6:
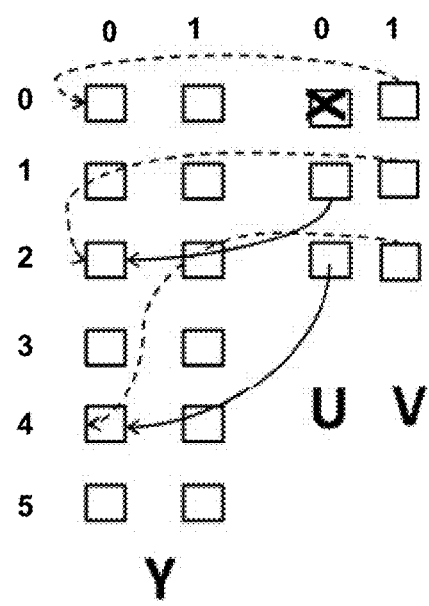

By way of example, FIG. 6 shows how to represent a pair of columns of the depth map on the YUV components by halving the number of rows with the approach called B mode in the side-by-side solution. The A mode described for the 4:2:0 side-by-side method can be used in a wholly similar manner by exchanging the row and column roles, and will not therefore be described any further for brevity's sake.

Figure 7:
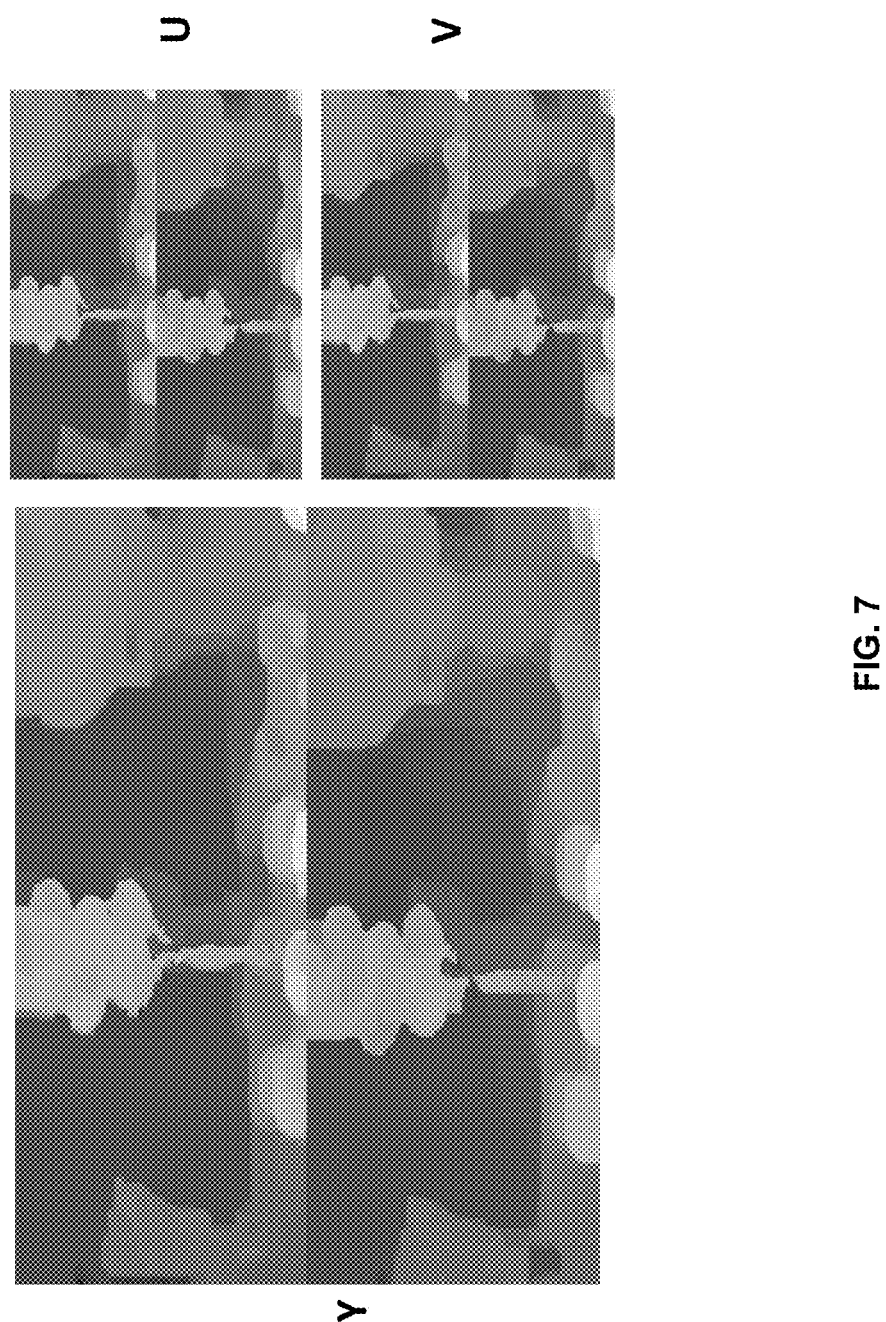
FIG. 7 shows images corresponding to the Y,U,V components of a color image obtained by arranging next to each other two depth maps in 4:2:0 top-and-bottom mode.

By (vertically) superimposing two images with W×H/2 resolution thus obtained, an image with W×H resolution is finally generated which represents the pair of depth maps in top-and-bottom mode, as shown in FIG. 7. Since colors cannot be used, said figure shows the three Y, U and V components separately.

Top-and-Bottom 4:2:0 Solution with Reduction of Chromatic Components.

The previous solutions allow some values of the depth maps to be represented as chrominance components of a color image, while ensuring good spatial coherence between the Y, U and V components. In the case of a common image (with real colors), the chrominance components are characterized by a low energetic content and hence by low entropy, and can be easily compressed by using known techniques. On the contrary, the U, V components of the previous solutions consist of pixels having the same energetic content as luminance.

In order to solve this problem, it is possible to replace the depth values to be entered into the chrominance components with difference values relative to a value predicted (or interpolated) by using the depth values represented on the Y component; in other words, a prediction error can be entered into the chrominance components. Since depth maps do not contain many details, the prediction is effective and the prediction error has a very low energetic content, and hence is suitable for being represented as chrominance.

Figure 8:
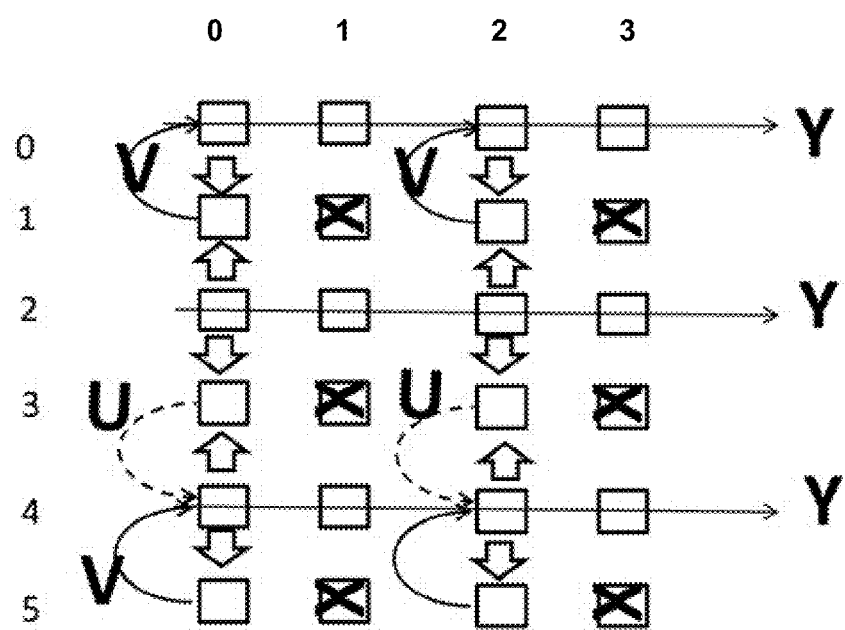
FIG. 8 shows a variant of the invention concerning the way of obtaining a color image containing two depth maps according to the 4:2:0 top-and-bottom solution with a reduction of the chromatic components.

By way of example, in FIG. 8, which shows the top-and-bottom configuration in B mode, the double arrows identify pairs of depth values through which it is possible to interpolate the depth values to be placed on the U and V components.

In FIG. 8, depth samples of the Y component are identified which can be used as predictions for the depth values intended for the U and V components in accordance with steps 2 and 3 of the previous repositioning algorithms. By using the notation of the previous algorithms, one can in fact calculate the following prediction errors:

$$D_e(4h+1,2k)=D(4h+1,2k)-\text{round}(\tfrac{1}{2}[D(4h,2k)+D(4h+2,2k)])$$

$$D_e(4h+3,2k)=D(4h+3,2k)-\text{round}(\tfrac{1}{2}[D(4h+2,2k)+D(4h+4,2k)])$$

where h,k are integer indices greater than or equal to zero, to be substituted for the corresponding depth values in the even columns prior to placement on the V and U components, respectively. In order to avoid storing fractional values of the prediction error, in the above formulae the predicted value is rounded (the round operator identifies the integer rounding operation). It must be pointed out that in this example a simple predictor is used, which consists of the mean between the two depth samples in the rows above and under the pixel under consideration.

The prediction error $D_e$ is a value with a sign. In the practical implementation, an offset of 128 is preferably added to such values, so that they can be represented on signless 8-bit values, upon saturation of the values obtained within the range [0 . . . 255].

Signless prediction errors are thus represented on the V and U components:

$$\tilde{D}_e(4h+1,2k)=D_e(4h+1,2k)+128$$

$$\tilde{D}_e(4h+3,2k)=D_e(4h+3,2k)+128$$

For simplicity, in the above formulae the step of clipping or saturating the values out of the 0-255 range has been omitted.

Upon reception, prior to interpolation of the missing samples (identified by the letter "X" in the drawings), e.g., according to the above-described technique, the predicted depth values will be reconstructed by inverting the previous formulae:

$$D(4h+1,2k)=\text{round}(\frac{1}{2}[D(4h,2k)+D(4h+2,2k)])+\tilde{D}_e(4h+1,2k)-128$$

$$D(4h+3,2k)=\text{round}(\frac{1}{2}[D(4h+2,2k)+D(4h+4,2k)])+\tilde{D}_e(4h+3,2k)-128$$

The prediction error rounding errors cause a reconstruction error with negligible effects compared with the quantization errors obtained by using a standard encoder.

Figure 9:
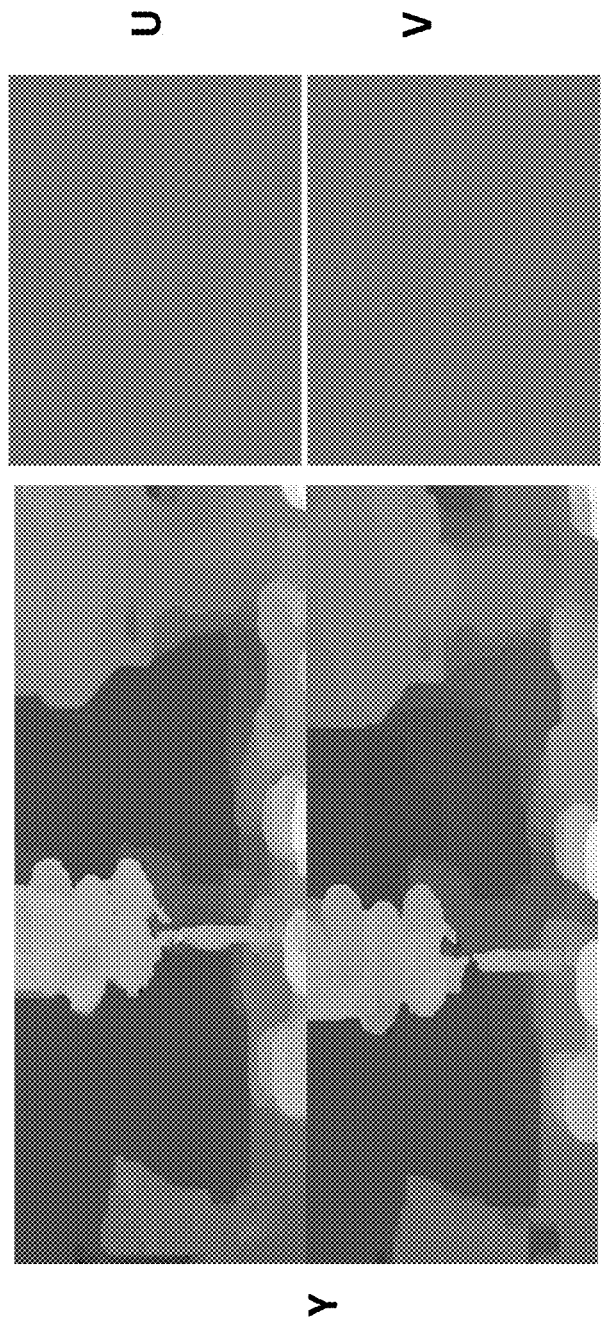
FIG. 9 shows images corresponding to the Y,U,V components of a color image obtained by arranging next to each other two depth maps in 4:2:0 top-and-bottom mode with a reduction of the chromatic components.

FIG. 9 shows one example of a composite image obtained by using the above-described system. One can see the low energetic content of the U and V components represented through images that, also because of printing approximation, appear to be uniform. The advantage of the solution under examination, in fact, is that it effects a reduction of the mean amplitude of chrominance components, thereby reflecting more the energetic distribution of the traditional YUV signal, wherein the energetic content is mostly concentrated on the Y component, compared with the U and V components. It should also be noted that the U and V components are "difference" signals (to be precise, they are called color difference signals), and hence they have a null mean value, so that, in an 8-bit representation, the value 128 corresponds to zero, while values smaller than 128 are considered to be negative and values greater than 128 are considered to be positive. MPEG compression algorithms are based on such properties of the U and V signals; therefore, if said signals do not represent any differences, as in the previous embodiment, the MPEG compression algorithms may turn out to be less effective.

The above-described approach has been exemplified, in the case of the top-and-bottom format, through the use of an interpolation procedure with only two samples, but it can obviously be extended to all of the solutions described so far and to other interpolation methods.

Top-and-Bottom 4:2:0 Solution with Mean Sums and Differences.

According to a further variant that allows to reduce the energetic contribution of the U and V components, the values of the depth maps are replaced with mean sums and differences, which are represented by using the luminance and chrominance components, respectively. The advantages of this variant are the same as those of the previous solution, in that in this case as well signals representing differences are entered into U and V.

The samples of each 2×2 block of the depth map are transformed into mean sums and differences as shown in FIG. 10 and below, where a,b,c,d represent the depth values in a 2×2 block of the depth map. The coefficients w0,w1 are mean values and must be rounded to the nearest integer (or truncated to the lower integer), so that they can then be represented on signless 8-bit samples.

The same process takes place for the difference coefficients w2, w3; moreover, since the latter have a sign, their absolute values are saturated to 128, so that their value can be represented on 8-bit samples by adding an offset of 128.

FIG. 10 also shows how to reconstruct the depth samples from the mean sums and differences, as quoted below.

$$w0=(a+c)/2 \quad a=(w0+w2)$$

$$w1=(b+d)/2 \quad b=(w1+w3)$$

$$\text{--->}$$

$$w2=(a-c)/2c=(w0-w2)$$

$$w3=(b-d)/2 \quad d=(w1-w3)$$

Due to the adopted roundings, the reconstruction of the depth values a,b,c,d will be accurate to less than an error of +/−1.

In order to obtain a color image of reduced dimensions, e.g., W×H/2 in the top-and-bottom case, it is necessary to discard one coefficient out of 4. The 3 coefficients selected can then be arranged on the Y,U,V components according to one of the above-described techniques.

This is achieved by keeping the two mean sums w0 and w1, which will be entered into the Y component, and by moving either the difference wd=w2 or the difference wd=w3 to U,V, depending on which one of the two values w2 or w3 ensures the smallest reconstruction error according to the following formulae.

The reconstruction error introduced by the selection of either w2 or w3 can be evaluated as follows. The mean error e(wd=w2), obtained in the case of wd=w2, and the mean error e(wd=w3), obtained in the case of wd=w3, are calculated; the coefficient wd that will then be selected for transmission is the one that minimizes the error as follows:

$$e(wd=w2)=|w1+w2-b|+|w1-w2-d|$$
$$e(wd=w3)=|w0+w3-a|+|w0-w3-c|$$
$$wd=\begin{cases} w2 & \text{if } e(wd=w2)<e(wd=w3) \\ w3 & \text{if otherwise} \end{cases}$$

In order to obtain a color image with W×H/2 resolution, the same algorithm already described can be followed.

For each row index j=0, 2, 4 . . . and each column index i=0, 2, 4, . . . .

The coefficients w0,w1,w2,w3 of the 2×2 block in the position j,i of the depth map are calculated The best mean difference wd is determined The mean sums are assigned to the Y component according to the formulae Y(j/2,i)=w0 and Y(j/2, i+1)=w1

Figure 11:
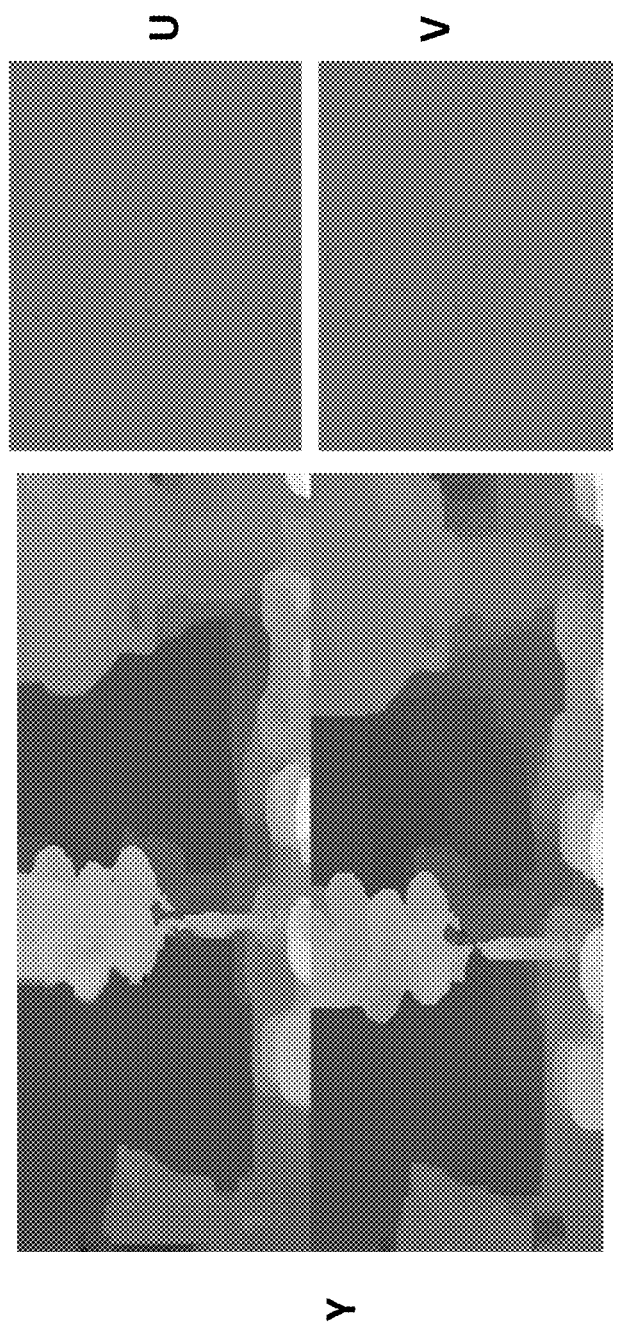
FIG. 11 shows images corresponding to the Y,U,V components of a color image obtained by arranging next to each other two depth maps in 4:2:0 top-and-bottom mode with mean sums and differences.

If the rest of the division of the index j by 4 is equal to 0, the mean difference is assigned according to the formula U(j/2,i)=wd Otherwise (if the index j is not a multiple of 4), V(j/2,i)=wd FIG. 11 shows one example of a color image obtained by using the above-described system in the top-and-bottom configuration, obtained by entering two depth maps with mean sums and differences. It can be seen that also in this case the chrominance components collect a low energetic content because of the very low dynamics associated with the value wd.

Upon reconstruction, the technique with mean sums and differences will not need a 3×3 interpolator filter, since it will be sufficient to apply the inverse formulae allowing to reconstruct the initial values a, b, c, d from the coefficients w0, w1 and wd:

$$a \approx w0 + wd$$

$$b \approx w1 + wd$$

$$c \approx w0 - wd$$

$$d \approx w1 - wd$$

The reconstruction error made depends on the choice of the mean difference wd and on the integer representation error of all coefficients. Tests have shown that such errors are negligible on reference depth maps with peak signal-to-noise ratios in excess of 50 dB.

Solution with Sub-Band Transform.

Figure 12:
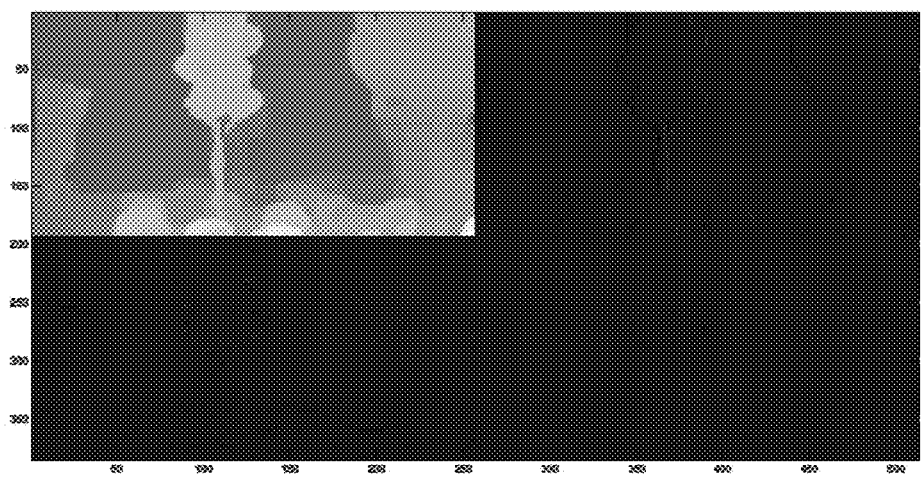
FIG. 12 shows images corresponding to the Y,U,V components of a first example of a color image obtained by arranging next to each other two depth maps pre-treated with sub-band transform operations.

The preceding technique based on means and differences of the depth values can be generalized by adopting a sub-band approach. By using a domain transform, e.g., of the 2×2 DCT type, i.e., a Walsh-Hadamard transform, or only one level of any Wavelet transform known in the literature, the image constituted by the depth map DM1 (and DM2) is divided into four sub-bands with halved resolution on both the rows and the columns, hence with W/2×H/2 resolution. Such sub-bands are generally indicated from left to right and from top to bottom as LL, LH, HL and HH sub-bands. FIG. 12 shows one example of a sub-band transform obtained by applying the Walsh-Hadamard transform separately to the rows and columns of a depth map. It can be observed that the transform concentrates most of the energy of the video signal in the LL sub-band (in the upper left part). For images containing few details, as is the case of depth maps, the HH sub-band collects very little energy. It can also be noticed that the coefficients of the HL, LH and HH sub-bands have a sign, and that an offset of 128 must be used in order to represent the value 0, as in the case of the mean differences described for the previous solution. Wanting to represent the transform coefficients on signless 8-bit samples, it will also be necessary to make appropriate roundings that may vary depending on the type of transform in use.

Since the resolution of the depth map must be reduced in the presence of a transformed domain, some coefficients can be eliminated: the best choice is to remove the entire HH band of both depth maps, thereby introducing a quality loss upon reconstruction. Reconstruction is of course achieved by applying the inverse transform, wherein the removed coefficients are assumed to be null.

Figure 13:
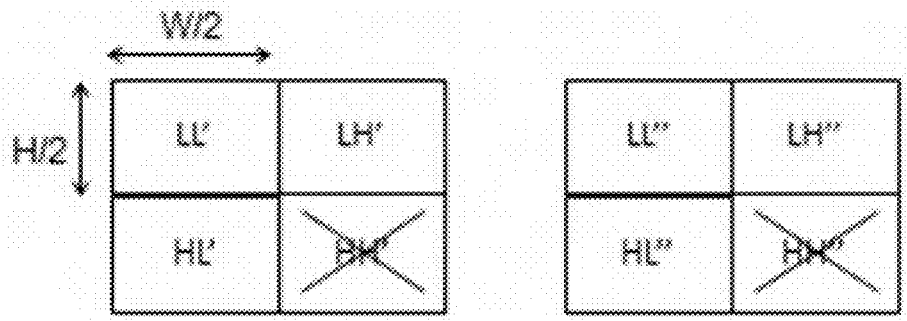
FIG. 13 shows a variant of the invention concerning the way of transforming samples of depth maps to obtain a color image containing two depth maps pre-treated with sub-band transform operations.
Figure 13:
Figure 13:
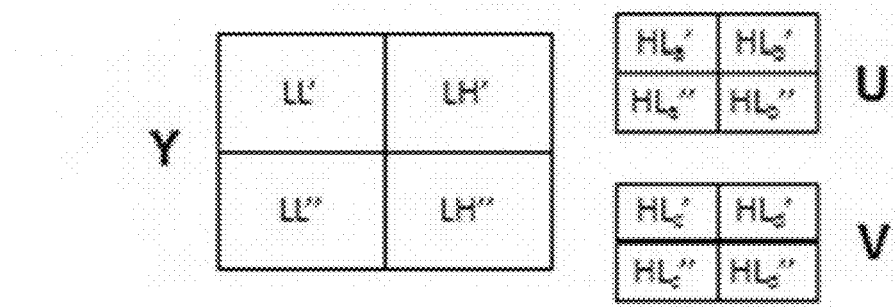

In order to build a single YUV image with W×H resolution by starting from the LL', LH' and HL' sub-bands of the left depth map and from the LL", LH" and HL" sub-bands of the right depth map, the diagram shown in FIG. 13 is followed, wherein DM1' and DM2' indicate the Hadamard transforms of the two depth maps DM1 and DM2. The Figure shows how to arrange the coefficients of the LL', LH' and LL", LH" sub-bands on the four quadrants of the luminance component Y. In particular, it has been chosen to associate the upper half of the Y component with the LL' and LH' sub-bands of the left depth map, and the lower half with the LL" and LH" sub-bands of the right depth map. To complete the reconstruction of the YUV image, it will be necessary to rearrange the remaining W/2×H/2 coefficients of the HL' and HL" sub-bands on the U and V components, without creating false edges due to misalignment of the three components. FIG. 13 shows how to obtain the desired result. The HL' sub-band of the left depth map is subdivided into 4 versions undersampled by a factor of 2 in both directions, as shown in FIG. 13; in practice, the coefficients of each 2×2 block are placed on 4 undersampled images. Thus, one obtains 4 images of the HL' sub-band, designated HLa', HLb', HLc' and HLd', with W/4×H/4 resolution. The first two images obtained are arranged next to each other in the upper part of the U component, occupying an area equivalent to H/4×W/2 samples. The two remaining images of the HL' sub-band are copied (next to each other) into the upper part of the V component. The same procedure is finally adopted for the HL" sub-band of the right depth map, but the W/4×H/4 images are copied into the lower half of the U and V components. This approach allows to maintain spatial coherence between the Y component and the U,V components with halved resolution.

Figure 14:
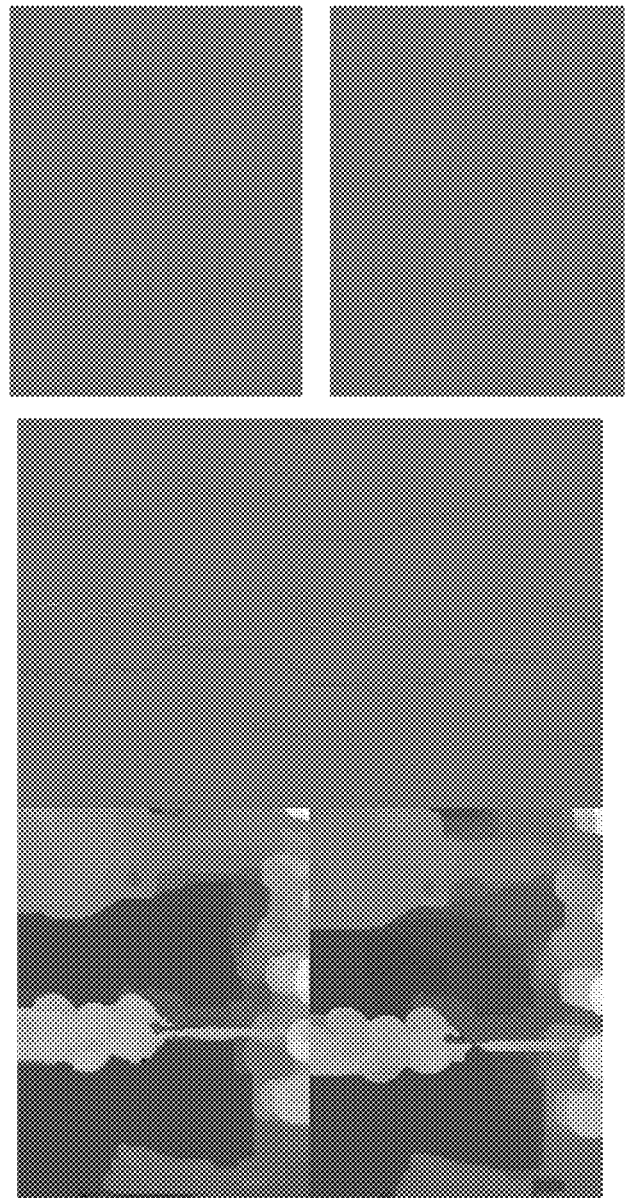
FIG. 14 shows images corresponding to the Y,U,V components of a second example of a color image obtained by arranging next to each other two depth maps pre-treated with sub-band transform operations.

One example of a color image obtained by using the Walsh-Hadamard transform is shown in FIG. 14. Also in this case, the energetic contribution associated with the U and V components is very low, which is beneficial in terms of compressibility of the video signal.

Synthesis of Two Depth Maps in a Television Production Chain (YUV 4:2:2 Format).

In the television production chain, the 4:2:2 YUV format is typically used. Compared with the case of the 4:2:0 format, the solutions for packing two maps into a single color image are simpler, in that the chrominance information (U,V) is present in 50% of the pixels. As a whole, therefore, 16 bits per pixel are available (eight for Y and eight for U, V), and it is thus possible to enter the two maps into the color image without any loss of information, and hence without the need for interpolating the missing pixels upon reception.

A first solution may consist of transmitting one map on Y and the other map on U and V. This solution, however, is not optimal because video compression algorithms are usually based on the assumption that luminance and chrominance are correlated to each other, as is the case in a real color image, whereas in the solution under examination Y belongs to one image and U,V belong to a different image. Therefore, also in the 4:2:2 case it will be better to rearrange the samples in such a way as to ensure the construction of an image with correlated Y,U,V components, by using mechanisms similar to those employed for the 4:2:0 YUV case.

Side-by-Side 4:2:2 Solution.

Figure 15:
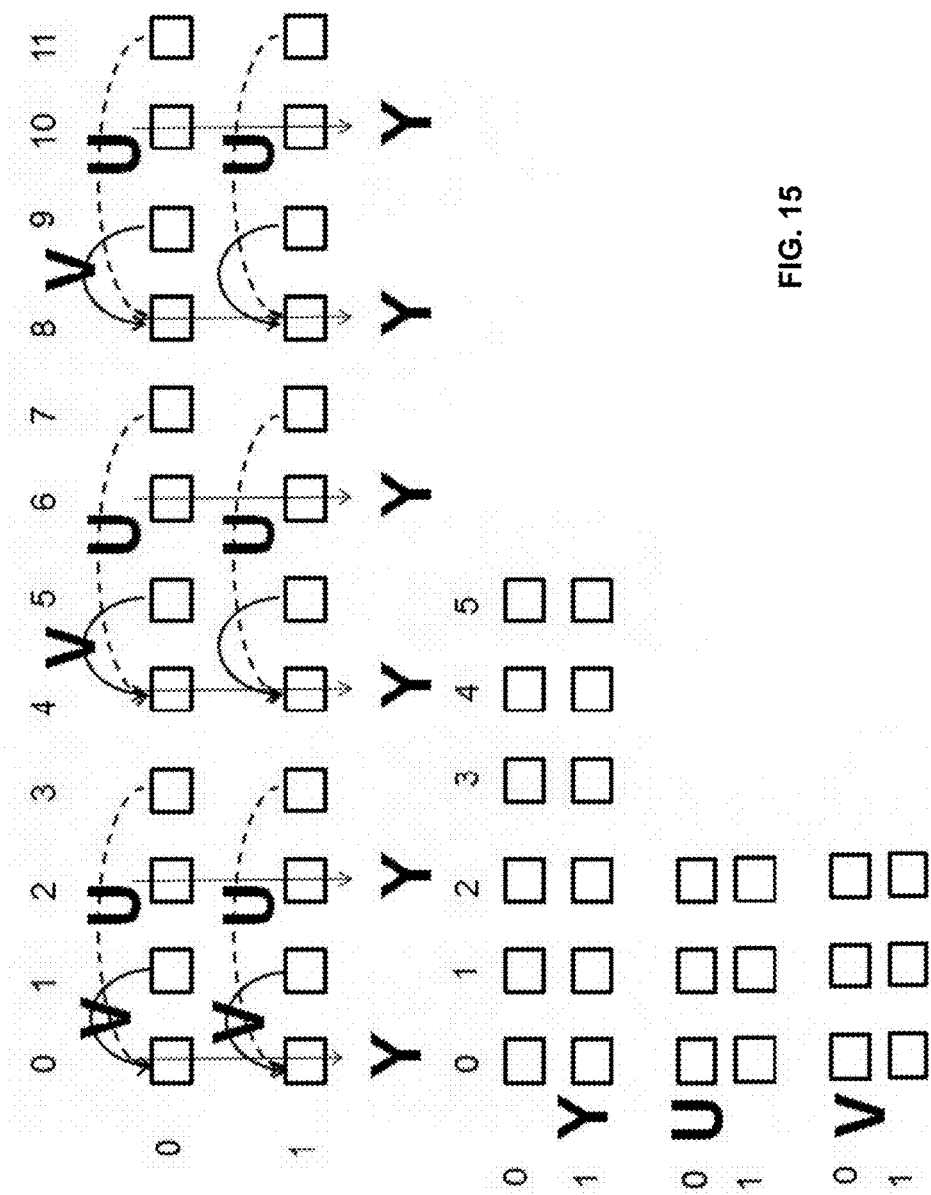
FIG. 15 shows a variant of the invention concerning the way of transforming samples of depth maps to obtain a color image containing two depth maps according to the 4:2:2 side-by-side solution.

The creation of the color image can be easily understood by examining FIG. 15. In the first pixel row, the pixels in the odd columns (1, 3, 5 . . . ) of the original depth map are transferred to U and V of the pixels in the even columns of the color image, in a way wholly similar to FIG. 2a. Since, differently from the 4:2:0 case, the pixels of the even columns (0, 2, 4 . . . ) of the color image have chrominance, the same thing occurs in the second pixel row as in the first row, i.e., the pixels in the odd columns of the original depth map are transferred to U and V of the pixels in the even columns of the color image. Therefore, there will no longer be any missing pixels (those marked with a cross in FIG. 2a) to be reconstructed by interpolation upon reception.

The same applies to the B mode. In this case as well, in all rows (even and odd) what is shown in FIG. 4 for the pixel row 0 occurs, and hence there will no longer be any missing pixels to be reconstructed by interpolation upon reception.

Top-and-Bottom 4:2:2 Solution.

Figure 16:
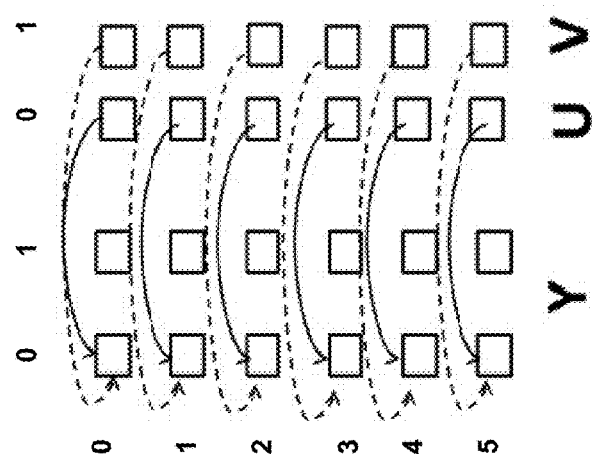
FIG. 16 shows a variant of the invention concerning the way of transforming samples of depth maps to obtain a color image containing two depth maps according to the 4:2:2 top-and-bottom solution.
Figure 16:
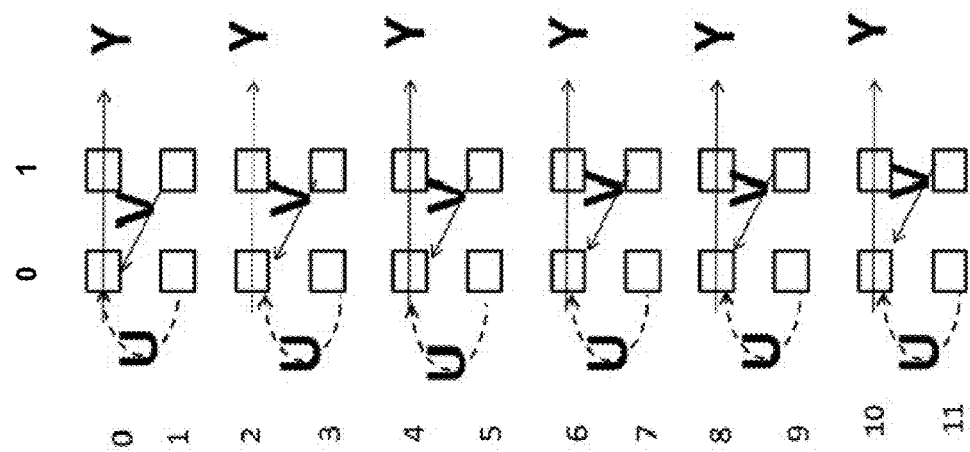

By way of example, one possible way to create the color image is shown in FIG. 16. The pixels in the odd rows, which are discarded, are reallocated on U and V of the pixels in the even rows, e.g., as indicated by the arrows. Reallocation may be effected in other substantially equivalent manners as well, which will not be described herein for brevity's sake.

Side-by-Side and Top-and-Bottom Solutions with Reduction of the Chromatic Components, 4:2:2 Format.

The previous solutions allow some values of the depth maps to be represented as chrominance components of a color image, while ensuring good spatial coherence between the Y, U and V components. In the case of a common image (with real colors), the chrominance components are characterized by a low energetic content, and hence by low entropy, and can be easily compressed by using known techniques. On the contrary, the U,V components of the previous solutions consist of pixels having the same energetic content as luminance. In order to solve this problem, it is possible to replace the depth values to be entered into the chrominance components with difference values relative to a value predicted (or interpolated) by using the depth values represented on the Y component; in other words, a prediction error can be entered into the chrominance components. Since depth maps are not very detailed, the prediction is effective and the prediction error has a very low energetic content, and hence is suitable for being represented as chrominance.

Figure 17:
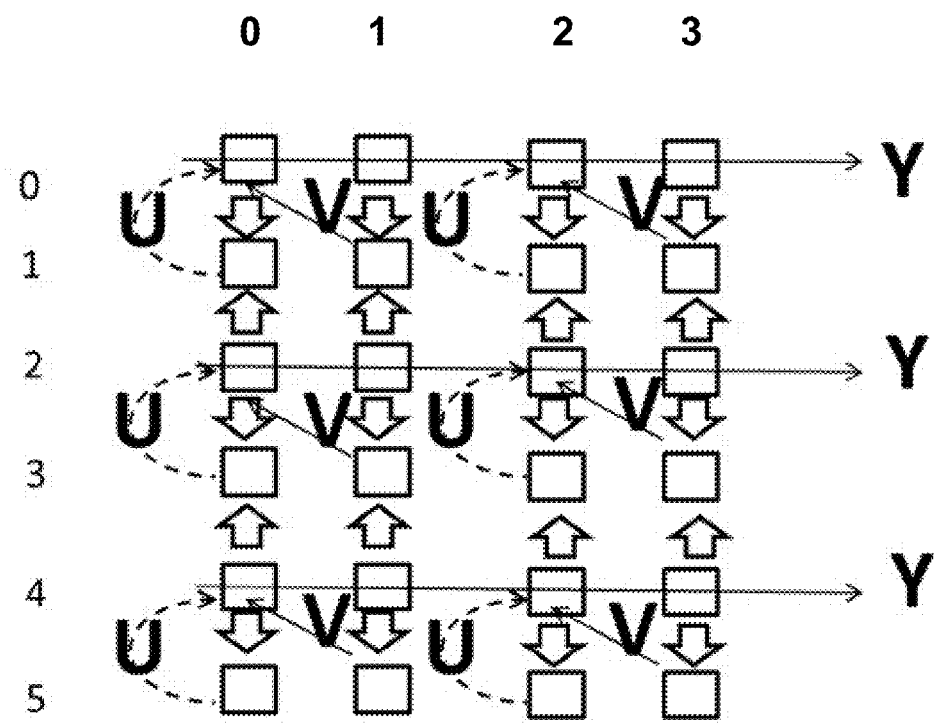
FIG. 17 shows a variant of the invention concerning the way of transforming samples of depth maps to obtain a color image containing two depth maps according to the 4:2:2 top-and-bottom or side-by-side solution with reduction of the chromatic components.

By way of example, in FIG. 17 the double arrows identify two depth values through which it is possible to interpolate the depth values to be placed on the U and V components in the top-and-bottom configuration of FIG. 16. In the representation of FIG. 16, the samples in the odd rows are interpolated by starting from the samples in the rows above and under it. Such values are also available upon receiving the color image, since they are located on the Y component. At this point, it is possible to calculate and enter, as values of the U,V components (according to the arrangement shown by the thin arrows in FIG. 16), the prediction errors made by the interpolator. Such values will be represented as signless integers by using the same techniques already described. The prediction errors transported by the U,V components will finally allow, upon reception, to reconstruct the depth values in the odd rows by applying the corresponding correction to the values interpolated from the Y component.

Top-and-Bottom 4:2:2 Solution with Mean Sums and Differences.

Also in the 4:2:2 case, a further variant that allows to reduce the energetic contribution of the U and V components provides for replacing the values of the depth maps with mean sums and differences, which are represented by using the luminance and chrominance components, respectively. The advantages of this variant are the same as those of the previous solution, in that in this case as well signals representing differences are entered into U and V. The samples of each 2×2 block of the depth map are transformed into mean sums and differences as shown in FIG. 10, where a,b,c,d represent the depth values in a 2×2 block of the depth map.

The only difference with respect to the 4:2:0 case is that with the 4:2:2 solution it is no longer necessary to discard one coefficient out of four, since both difference coefficients can be entered into U and V. Upon reception, therefore, the map will be reconstructed with no errors, except for a loss of precision of +/−1 induced by the signless integer representation of the mean sums and differences.

Solution with Sub-Band Transform, 4:2:2 Format.

Figure 18:
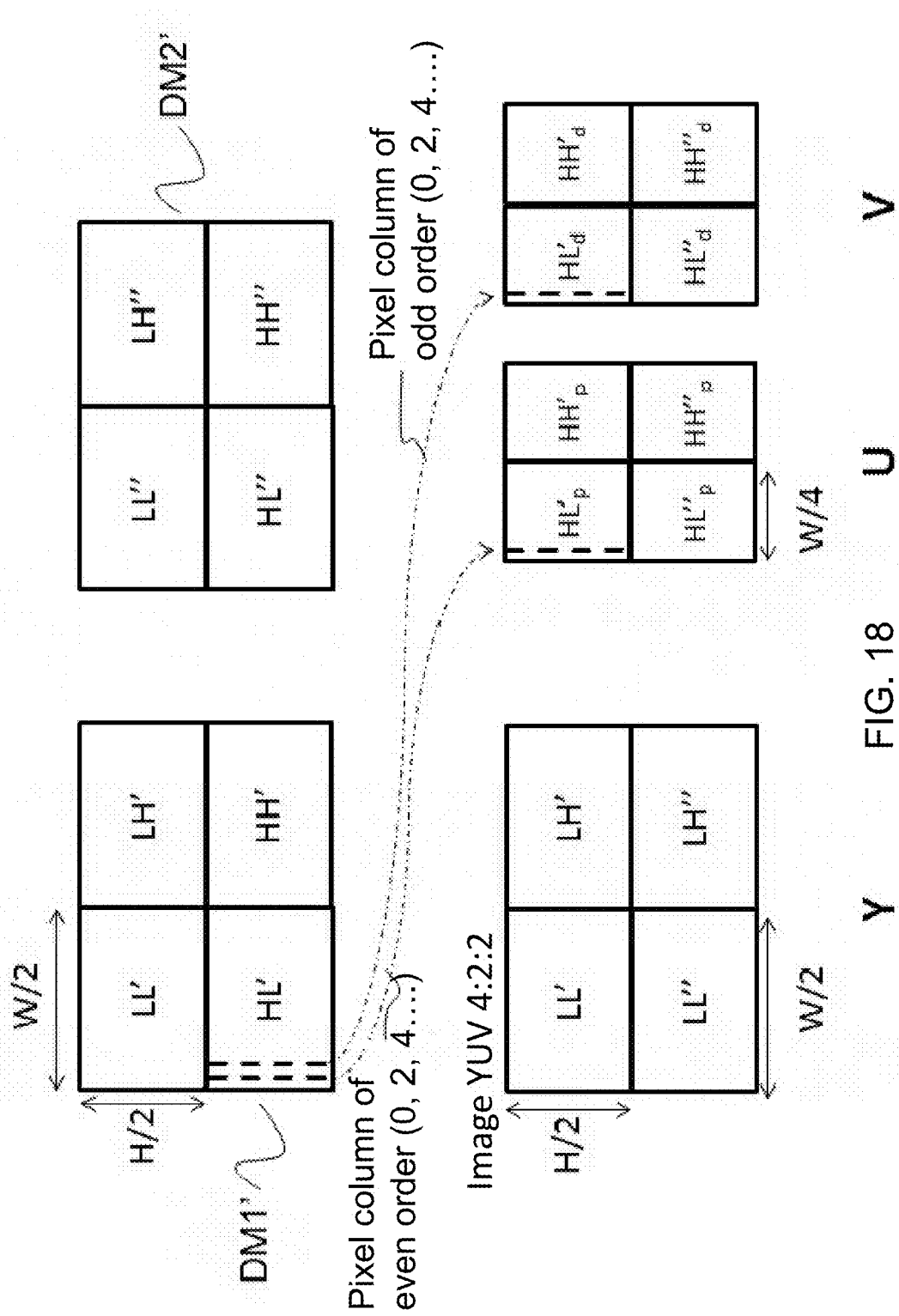
FIG. 18 shows a variant of the invention concerning the way of transforming samples of depth maps to obtain a color image containing two depth maps pre-treated with sub-band transform operations for the 4:2:2 format.

By applying only one level to any sub-band transform, the image formed by the depth map is divided into four sub-bands with halved resolution in both the rows and the columns, i.e., with W/2×H/2 resolution. Such sub-bands are generally indicated from right to left and from top to bottom as LL, LH, HL and HH sub-bands. When using the 4:2:2 YUV format, one can represent the transforms of two depth maps in a single color image by using the procedure shown in FIG. 18, where DM1' and DM2' indicate the sub-band transforms of the two depth maps DM1 and DM2. Unlike the similar technique proposed for the 4:2:0 YUV format (see FIG. 13), in this case it is possible to set all four sub-bands of DM1' and DM2'. In the solution proposed herein by way of example, a top-and-bottom color image is formed. The U,V components are constructed in such a way as to maintain spatial correlation with the corresponding images of Y, by entering the LH and HH sub-bands undersampled by column; in particular, the even columns are entered into the U component, while the odd columns are entered into the V component.

Entering Only One Map.

It should be noted that the present invention is also applicable to the case of presence of only one depth map. In this case, the techniques proposed herein allow to construct a color image with halved resolution (by row or column) compared with that of the original depth map.

Complete Generation and Reconstruction System.

The solutions proposed herein can be used for sending a pair of stereoscopic video sequences, along with the respective depth maps, to a visualization system, thus allowing the synthesis of any intermediate viewpoint.

Figure 19A:
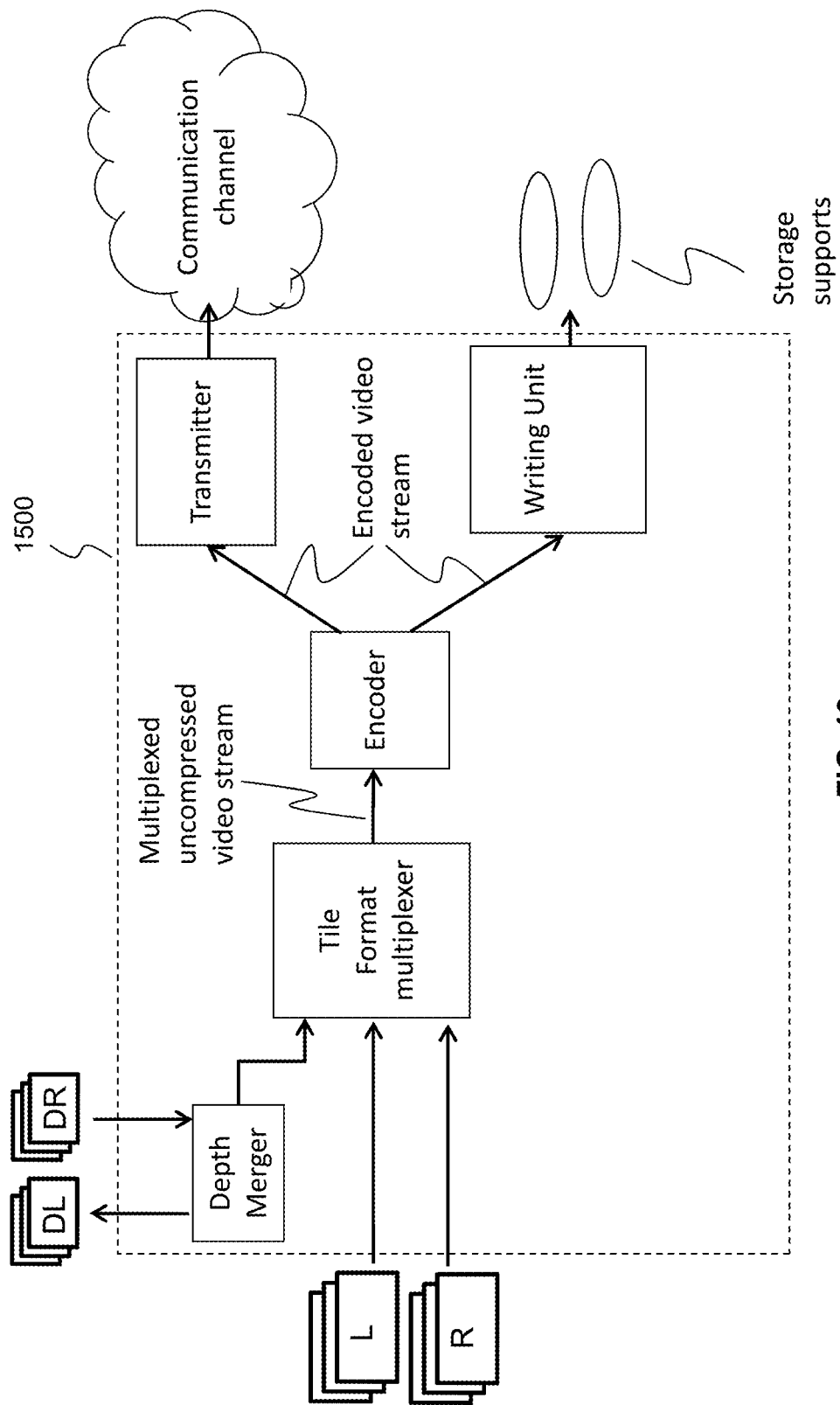
FIGS. 19a and 19b show block diagrams of an example of embodiment of a complete system for regenerating and, respectively, reconstructing and displaying three-dimensional images, which uses the frame-packing format known as tile format to organize a pair of stereoscopic video sequences with their respective depth maps in accordance with the invention.
Figure 19B:
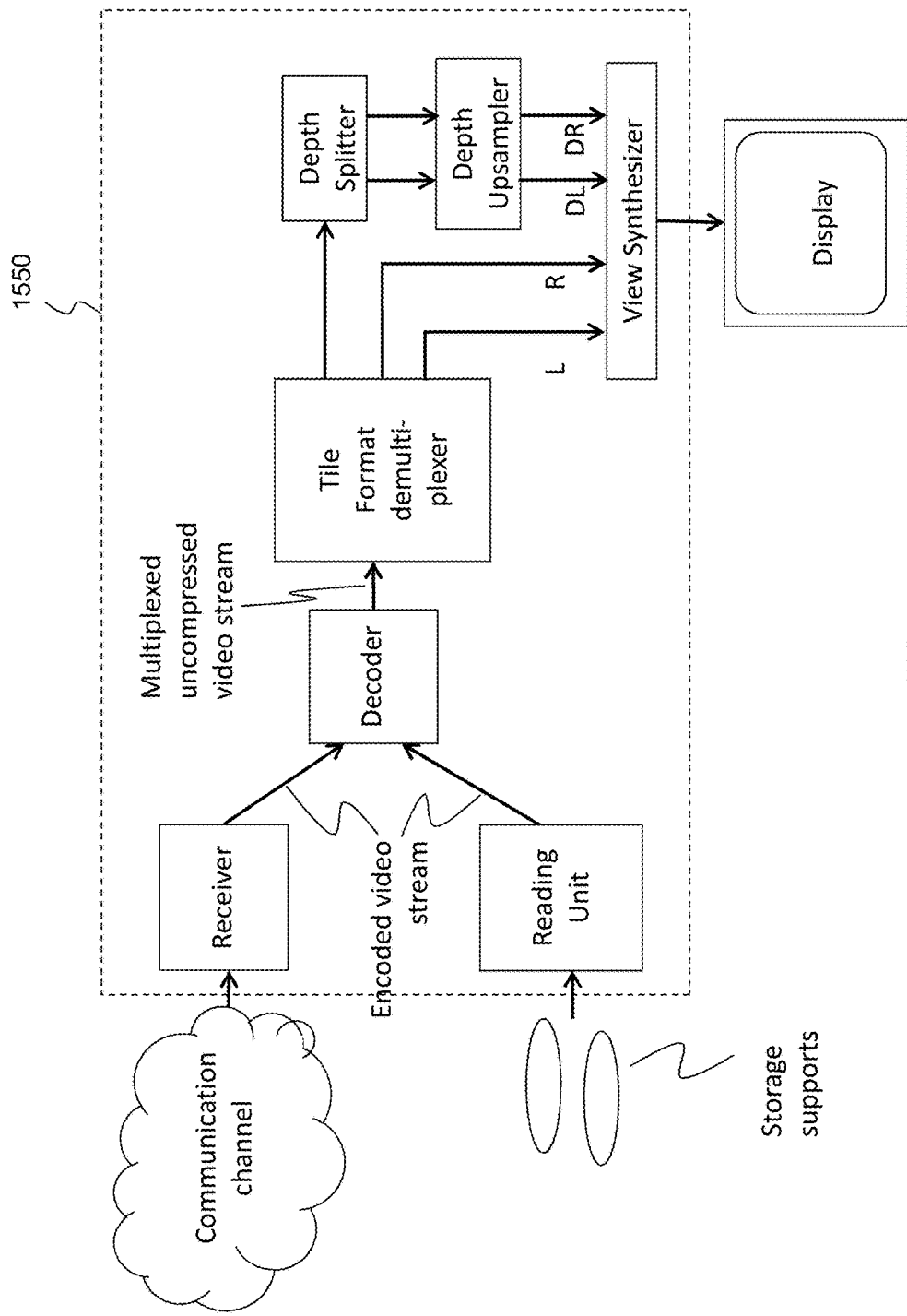

FIGS. 19a and 19b show an example of a complete generation, reconstruction and visualization system that uses the frame-packing format known as tile format, the generation side being separated from the reconstruction and visualization side.

Figure 1:
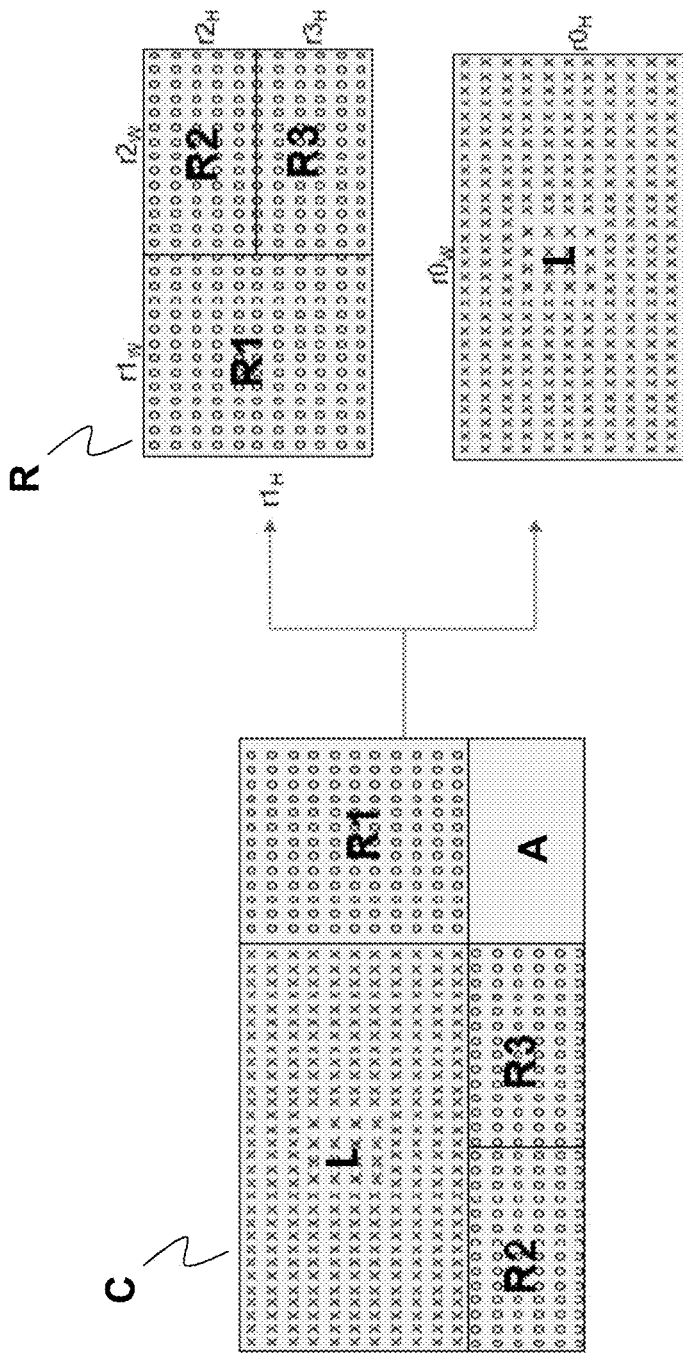
FIG. 1 shows the stereoscopic video image format called "tile format"

In particular, in the proposed system two depth maps with W×H resolution, designated in the drawing as left depth map DL (Depth Left) and right depth map DR (Depth Right) (possibly obtained by undersampling to 4:1 two depth maps of the two views with 2W×2H dimensions) are merged by a device called "depth merger" into a single 4:2:0 YUV color image with W×H resolution by adopting one of the techniques proposed herein. Then the tile-format multiplexer device constructs the tile-format composite frame by starting from two stereoscopic images with 2W×2H resolution and the respective pair of depth maps with W×H resolution. The pair of depth maps occupy exactly the space left available by the frame-packing format in the lower right corner (see FIG. 1). A single image with 3W×3H resolution is thus obtained, which can transport all the components of the stereoscopic signal. Assuming W=640 and H=360, a tile-format image with 1920×1080 resolution will be produced, which is compatible with the high-definition video format known as 1080p. The video signal constituted by the tile-format images thus becomes compatible with any infrastructure for coding, transmitting or transporting a 1920×1080 video signal.

A known encoder (e.g., MPEG4 or HEVC) can effectively compress the stereoscopic video stream produced by the tile-format multiplexer for transmission on a communication channel, possibly after other treatments (multiplexing with other contents, modulation, etc.). Alternatively, the coded stream can be stored by a writing unit into any storage means (volatile or non-volatile semiconductor memory, optoelectronic medium, etc.) for future fruition.

On the receiver side (see FIG. 19b), the stereoscopic video stream received from the communication channel or read from a storage medium is decoded and sent to the tile-format demultiplexer, which extracts the pair of stereoscopic images L and R with 2W×2H resolution and the color image produced upon generation by the depth merger. A splitting unit called depth splitter extracts from said image the pair of color depth maps with W×H resolution DL and DR, which can be expanded to their original 2W×2H size by a simple known interpolation device called depth up-sampler. A view synthesizer device calculates the intermediate views between R and L for visualization through a self-stereoscopic device.

It should be noted that the description of the apparatuses for generation (1500) and reconstruction (1550) of a stereoscopic video stream obtained by applying the invention to depth maps may be subject to many variations. For example, the functions of the depth merger and tile-format multiplexer may actually be carried out by the same physical device; on the reconstruction side, the synthesis and visualization of the stereoscopic images may be carried out by the same apparatus or by two distinct apparatuses.

Reconstruction Operations.

For reconstructing the depth maps in accordance with the invention, operations are carried out which are inverse to those for generating the color images according to the above-described variants.

In particular, the method for reconstructing at least one depth map (DM1, DM2) by starting from a color image composed of a plurality of components (Y, U, V) provides for entering into the depth map a first set of pixels taken from the luminance component (Y), a second set of pixels taken from one of the chrominance components (U), and a third set of pixels taken from the other chrominance component (V) of said color image (Y, U, V).

Preferably, by recopying the first, second and third sets of pixels, all the pixels of said at least one depth map are obtained; or, by recopying the first, second and third sets of pixels, some pixels of the depth map are obtained, and the missing pixels are obtained by subjecting the recopied pixels to interpolation operations.

In some possible variants, the second and third sets (U and V) contain differences with respect to interpolated values, so that upon reconstruction it will be necessary to first calculate the interpolated values and then apply the corrections obtained from U and V.

In some possible variants, the method comprises the step of replacing the values (w0, w1, wd) taken from the first, second and third sets of pixels of the color image with sums and differences thereof which allow reconstructing the values (a, b, c, d) to be copied into a pixel block of the depth map (DM1, DM2).

In further possible variants, the method provides for making a domain transformation which is inverse to the one carried out at the generation stage in order to obtain said depth map (DM1,DM2), after recopying the sets of pixels of the components (Y, U, V) of the color image.

The apparatus for reconstructing at least one depth map (DM1, DM2) by starting from a color image composed of the Y, U, V components according to the invention comprises means for entering into the at least one depth or disparity map a first set of pixels taken from the luminance component (Y), a second set of pixels taken from one of the chrominance components (U), and a third set of pixels taken from the other chrominance component (V) of said color image (Y, U, V).

In said apparatus, preferably, the first, second and third sets of pixels cover all the pixels of the at least one depth or disparity map.

As an alternative, the first, second and third sets of pixels cover some pixels of the at least one depth or disparity map, and pixels obtained by subjecting the recopied pixels to interpolation operations are entered into the remaining pixels.

The apparatus can reconstruct two depth maps DM1, DM2 having the same W×H size, and in the color image Y,U,V the luminance component Y has the same W×H size as the two depth or disparity maps DM1, DM2.

Preferably, the apparatus comprises means for making a sum or a difference of the values of the pixels selected from a group of pixels with respect to a predicted or interpolated reference value, the latter value being obtained from values of pixels belonging to the first set, in order to obtain the pixels of the second and third sets.

Preferably, the apparatus comprises means for replacing the values w0, w1, wd taken from the first, second and third sets of pixels of the color image with sums and differences thereof, so as to reconstruct the values a,b,c,d to be copied into a pixel block of the at least one depth map DM1, DM2.

Preferably, the apparatus comprises means for making a domain transformation which is inverse to the one carried out at the generation stage in order to obtain said at least one depth map DM1,DM2, after recopying the sets of pixels of said components Y, U, V of the color image.

In the case wherein depth maps are entered into a tile-format composite frame, in all of the above-described variants a universal format is obtained for generating, transporting and reproducing 3D contents on all present and future types of displays.

In the case of a 2D reproduction device, the video processor of the device will simply discard the images R and the depth maps DM1 and DM2 that may be present in the decoded video frame, and will display, subject to scaling, only the sequence of images L on an associated visualization device.

The same applies to the case of a 3D reproduction device in which the user has activated the 2D display mode.

A 3D reproduction device in which the 3D display mode has been activated may show two different behaviors, depending on whether the player offers or not to the user the possibility of adjusting (decreasing) the depth of the scene. In the latter case, the video processor will use the two sequences of images L (Left) and R (Right) to generate the three-dimensional effect. In the former case, the video processor will use the depth maps (one or two) included in the composite frames associated with each pair of stereoscopic images R and L to generate intermediate views between L and R, thereby obtaining three-dimensional images having a variable depth, lower than that attainable from L and R.

The last application case is represented by self-stereoscopic players, which need a very large number of views (some tens of them) to generate the three-dimensional effect for viewers positioned at different points in the space in front of the display. In this case, the video processor will use the depth maps (one or two) included in the composite frames, along with the images L and R themselves, to synthesize a series of other images.

In conclusion, the video processor of the reproduction device may comprise means adapted to send to the display two sequences of images, at least one of which consists of images synthesized by starting from at least one of the transmitted views and from at least one depth map. In this case, it preferably also comprises means adapted to give the viewer the possibility of choosing sequences of images relating to more or less close viewpoints, so as to be able to vary the perception of depth.

The video processor of the reproduction device may also comprise means adapted to generate further images corresponding to further views, so that viewers positioned at different points in space can see different sequences of images through an associated self-stereoscopic display.

None of the formats proposed so far offers such flexibility and breadth of use, while at the same time still ensuring very good reproduction quality in terms of balance of the horizontal and vertical resolution and of proper resolution assignment to the stereoscopic images and to the associated depth maps.

The above-described reconstruction operations can be carried out partly in the receiver device and partly in the visualization device (player). The present invention can advantageously be implemented through a computer program comprising coding means for executing one or more steps of the method. It is therefore understood that the protection scope extends to said computer program as well as to computer-readable means that comprise a recorded message, said computer-readable means comprising program coding means for implementing one or more steps of the method when said program is executed by a computer.

The above-described example of embodiment may be subject to variations without departing from the protection scope of the present invention, including all equivalent designs known to a man skilled in the art.

The present description has tackled embodiments of the invention wherein the sampling system employed for the color image is 4:2:0 or 4:2:2, which are the most widespread ones. Nevertheless, it is likewise applicable to any other sampling system, such as 4:4:4, 4:1:1, 4:1:0, for example, by performing, wherever necessary, operations for undersampling the image to initial grayscale levels.

The elements and features shown in the various preferred embodiments may be combined together without however departing from the protection scope of the present invention.

From the above description, those skilled in the art will be able to produce the object of the invention without introducing any further construction details.

What is claimed is:

1. A method for generating a color image, in an image processing electronic apparatus comprising an encoder for generating a video stream comprising a sequence of color images, said color image being composed of a plurality of components including a luminance component, a first chrominance component and a second chrominance component, starting from at least one depth or disparity map, said at least one depth or disparity map comprising luminance components only, the method comprising:
  selecting, from said at least one depth or disparity map, a first set of pixels, a second set of pixels and a third set of pixels;
  entering the first set of pixels of said at least one depth or disparity map into the luminance component of said color image in said encoder of the electronic apparatus;
  entering the second set of pixels of said at least one depth or disparity map into the first chrominance component of said color image in said encoder of the electronic apparatus; and
  entering the third set of pixels of said at least one depth or disparity map into the second chrominance component of said color image, said color image being a dummy color image comprising only luminance components of said at least one depth or disparity map,
  wherein the first, second, and third set of pixels are selected from said at least one depth or disparity map in such a way as to obtain a spatial correlation between the luminance component, the first chrominance component, and the second chrominance component of the resulting color image.

2. The method according to claim 1, wherein the spatial correlation of said luminance component and said first and second chrominance components of the resulting color image is assured by the fact that the chosen pixels of the depth map to be put into said three components of the same pixel in the resulting color image are spatially close in the depth map.

3. The method according to claim 1, wherein the union of said first, second and third sets comprises all the pixels of said at least one depth or disparity map.

4. The method according to claim 1, wherein said first, second and third sets comprise only a part of all the pixels of said at least one depth or disparity map.

5. The method according to claim 1, wherein two depth or disparity maps of W×H size are entered into a color image of the same size by using a side-by-side or top-and-bottom technique.

6. The method according to claim 1, wherein the pixels of said second and third sets belonging to a group of pixels are replaced with difference values relative to a predicted or interpolated value, the latter being obtained from values of pixels belonging to said first set.

7. The method according to claim 1, comprising the step of replacing the pixels of said at least one depth or disparity map belonging to a group of contiguous pixels with sums or differences thereof, by calculating sums and differences of said pixels and then placing the sums into the luminance component and choosing only one of the differences to be alternately placed into the chrominance components.

8. The method according to claim 1, comprising the step of replacing the pixels of said at least one depth or disparity map belonging to a group of contiguous pixels with sums or differences thereof, by calculating sums and differences of said pixels and then placing the sums into the luminance component, the first one of the two differences into a chrominance component, and the second one into the other chrominance component.

9. The method according to claim 1, comprising the step of subjecting said at least one depth or disparity map to a domain transformation prior to entering said sets of pixels into said components of the color image.

10. The method for generating a video stream comprising a sequence of color images obtained by using a method according to claim 1.

11. The method for generating a video stream using the tile format frame-packing format, wherein a color image is entered into the frame part which is free from pixels of images relating to the two stereoscopic views, in accordance with claim 1.

12. An apparatus comprising image processing means adapted to generate a video stream comprising a sequence of color images obtained by using a method according to claim 1.

13. A method for reconstructing at least one depth or disparity map, in an image processing electronic apparatus comprising a decoder for reconstructing at least one depth or disparity map, by starting from a color image composed of a plurality of components, said plurality of components of said color image containing only luminance components of at least one originating depth or disparity map, the method comprising:
  receiving, at the decoder, a video stream that includes a dummy color image comprising a luminance component, a first chrominance component, and a second chrominance component, wherein the contents of each of said components derive from a set of pixels pertaining to said at least one depth or disparity map, wherein the contents derived from said set of pixels provide a spatial correlation between the luminance component, the first chrominance component, and the second chrominance component of the dummy color image;

obtaining, in said decoder of the electronic apparatus, a first set of pixels from the luminance component of said color image, obtaining, in said decoder of the electronic apparatus, a second set of pixels from the first chrominance component, and obtaining, in said decoder of the electronic apparatus, a third set of pixels from the second chrominance component of said color image;

entering the first, second, and third set of pixels into said at least one depth or disparity map.

14. The method according to claim 13, wherein said first set of pixels is taken from the luminance component, said second set of pixels is taken from the first chrominance components, and said third set of pixels is taken from the second chrominance component of said color image.

15. The method according to claim 14, wherein two depth or disparity maps are obtained, which have the same size as said color image, by obtaining said first, second and third sets of pixels.

16. The method according to claim 13, wherein said first set of pixels is taken from the luminance component, whereas said second or third sets are obtained by making a sum of the values taken from the first or, respectively, the second of said chrominance components and a predicted value obtained using the depth values represented on said luminance component.

17. The method according to claim 13, wherein all the pixels of said at least one depth or disparity map are obtained by obtaining said first, second and third sets of pixels.

18. The method according to claim 13, wherein some pixels of said at least one depth or disparity map are obtained by obtaining said first, second and third sets of pixels, and the missing pixels are obtained from the recopied pixels by means of interpolation operations.

19. The method according to claim 13, wherein, after said sets of pixels have been obtained from said components of the color image, a domain transformation inverse to the one carried out at the generation stage is made in order to obtain said at least one depth map.

20. The method for reconstructing a video stream using a frame-packing format called tile format, comprising steps for reconstructing at least one depth or disparity map by starting from a color image present in the frame part which is free from pixels of images relating to the two stereoscopic views, according to claim 13.

21. A method for reconstructing at least one depth or disparity map, in an electronic apparatus comprising a decoder for reconstructing at least one depth or disparity map, starting from a color image composed of components, the method comprising:

receiving, at the decoder, a video stream that includes a dummy color image comprising a luminance component, a first chrominance component, and a second chrominance component, wherein the contents of each of said components derive from a set of pixels pertaining to said at least one depth or disparity map, wherein the contents derived from said set of pixels provide a spatial correlation between the luminance component, the first chrominance component, and the second chrominance component of the dummy color image;

extracting three sets of pixel values, in said decoder of the electronic apparatus, each of the sets being taken from different components of said color image;

linearly combining, in said decoder of the electronic apparatus, pixel values taken from said components that are located in contiguous positions of the components, the combination generating reconstructed pixel values of a depth map or a disparity map; and copying, in said decoder of the electronic apparatus, said reconstructed pixel values into said at least one reconstructed depth or disparity map.

22. An apparatus comprising:

a decoder for image processing, wherein the decoder is configured to:

receive a video stream that includes a dummy color image comprising a luminance component, a first chrominance component, and a second chrominance component, wherein the contents of each of said components derive from a set of pixels pertaining to said at least one depth or disparity map, wherein the contents derived from said set of pixels provide a spatial correlation between the luminance component, the first chrominance component, and the second chrominance component of the dummy color image; and reconstruct the at least one depth or disparity map by starting from the color image composed of the plurality of components, the plurality of components including a luminance component (Y), a first chrominance component (U) and a second chrominance component (V), said plurality of components of said color image containing only luminance components of at least one depth or disparity map, wherein a first set of pixels are positioned in the luminance component, a second set of pixels are positioned in the first chrominance component, and a third set of pixels are positioned in the second chrominance component; and an electronic combiner for entering the first set of pixels obtained from the luminance component (Y), the second set of pixels obtained from the first chrominance components (U), and the third set of pixels obtained from the second other chrominance component (V) into said at least one depth or disparity map.

\* \* \* \* \*